US010083249B2

(12) United States Patent
Nixon et al.

(10) Patent No.: US 10,083,249 B2
(45) Date of Patent: Sep. 25, 2018

(54) SYSTEMS, METHODS AND ARTICLES OF MANUFACTURE TO PROVIDE A SEARCH SERVICE TO A PROCESS CONTROL SYSTEM

(75) Inventors: Mark Nixon, Round Rock, TX (US); Eric Rotvold, West Saint Paul, MN (US); Jeff Potter, Shorewood, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 811 days.

(21) Appl. No.: 12/889,060

(22) Filed: Sep. 23, 2010

(65) Prior Publication Data
US 2012/0078896 A1  Mar. 29, 2012

(51) Int. Cl.
G06F 17/30 (2006.01)
G05B 19/042 (2006.01)

(52) U.S. Cl.
CPC ..... *G06F 17/30943* (2013.01); *G05B 19/042* (2013.01); *G05B 2219/31166* (2013.01)

(58) Field of Classification Search
CPC ........ G06F 17/30943; G06F 17/30312; G06F 17/30545; G06F 17/30554; G06F 17/30864; G05B 19/042; G05B 2219/31166
USPC ................................. 707/706, 731, 769, 732
See application file for complete search history.

(56) References Cited

U.S. PATENT DOCUMENTS 5,212,765 A * 5/1993 Skeirik ........................ 395/11
7,664,797 B1 2/2010 Weisgerber
7,689,544 B2 * 3/2010 Koenig ........................ 707/769
7,698,323 B1 4/2010 Rangan et al.
8,014,880 B2 * 9/2011 Samardzija et al. ............ 700/17
8,086,955 B2 * 12/2011 Zhou et al. .................... 715/234

(Continued)

FOREIGN PATENT DOCUMENTS

CN   101201598   6/2008
CN   101398685   4/2009

(Continued)

OTHER PUBLICATIONS

State Intellectual Property Office of the People's Republic of China, "Notification of the First Office Action", issued in connection with Chinese Patent Application No. 201110290520.7, dated Jan. 22, 2016, 19 pages.

(Continued)

*Primary Examiner* — Scott A. Waldron
*Assistant Examiner* — Andalib F Lodhi
(74) *Attorney, Agent, or Firm* — Hanley, Flight & Zimmerman, LLC

(57) ABSTRACT

Systems, methods, and articles of manufacture to provide a search service to users of a process control system are disclosed. An example system includes a search database to store a set of searchable items associated with a process control system and to store a search profile associated with a selected query result, a publisher to collect information associated with the searchable items from the process control system and to publish the collected information to the search database, and a searcher to receive a request including the search profile and a query of the searchable items in the database, to search the searchable items based on the query, and to return at least a portion of the collected information based on the search profile.

20 Claims, 10 Drawing Sheets

(56) References Cited

U.S. PATENT DOCUMENTS

| | | | |
|---|---|---|---|
| 2002/0024532 A1* | 2/2002 | Fables et al. | 345/700 |
| 2002/0163427 A1* | 11/2002 | Eryurek et al. | 340/500 |
| 2003/0097441 A1* | 5/2003 | Konomi | 709/224 |
| 2004/0024891 A1* | 2/2004 | Agrusa et al. | 709/230 |
| 2004/0122812 A1* | 6/2004 | Yoshimura et al. | 707/3 |
| 2005/0012608 A1* | 1/2005 | Havekost et al. | 340/517 |
| 2007/0061786 A1* | 3/2007 | Zhou et al. | 717/136 |
| 2008/0059527 A1* | 3/2008 | Thieme et al. | 707/104.1 |
| 2008/0243595 A1* | 10/2008 | Kumazawa | 705/10 |
| 2008/0307461 A1* | 12/2008 | Tanikawa | 725/53 |
| 2009/0089247 A1* | 4/2009 | Blevins et al. | 707/3 |
| 2009/0112532 A1 | 4/2009 | Foslien et al. | |
| 2009/0150358 A1 | 6/2009 | Oyama | |
| 2010/0250578 A1* | 9/2010 | Athsani | G06F 17/30867 707/765 |
| 2011/0066612 A1* | 3/2011 | Resnick | 707/728 |

FOREIGN PATENT DOCUMENTS

| | | |
|---|---|---|
| JP | 2001344276 | 12/2001 |
| JP | 2002140361 | 5/2002 |
| JP | 202230021 | 8/2002 |
| JP | 2002278975 | 9/2002 |
| JP | 2003015877 | 1/2003 |
| JP | 2003342652 | 12/2003 |
| JP | 2005227881 | 8/2005 |
| JP | 2005532671 | 10/2005 |
| JP | 2006048581 | 2/2006 |
| JP | 2006285632 | 10/2006 |
| JP | 2008507041 | 3/2008 |
| JP | 2008217370 | 9/2008 |
| JP | 2009076037 | 4/2009 |
| JP | 2009140241 | 6/2009 |
| WO | 2009038947 | 3/2009 |

OTHER PUBLICATIONS

State Intellectual Property Office of the People's Republic of China, "Notification of the Second Office Action", issued in connection with Chinese Patent Application No. 201110290520.7, dated Dec. 1, 2016, 9 pages.

Japanese Patent Office, "Notice of Reasons for Rejection," issued in connection with Japanese Patent Application No. 2011-197173, dated Jun. 28, 2016, 3 pages.

Intellectual Property Office of the United Kingdom, "Examination Report under Section 18(3)," issued in connection with Patent Application No. GB1115639.5, dated Dec. 12, 2017, 5 pages.

Japanese Patent Office, "Decision of Refusal," issued in connection with Japanese Patent Application No. 2011-197173, dated Feb. 21, 2017, 6 pages.

Japanese Patent Office, "Notice of Reasons for Rejection," issued in connection with Japanese Patent Application No. 2017-120510, dated May 22, 2018, 15 pages.

* cited by examiner

SYSTEMS, METHODS AND ARTICLES OF MANUFACTURE TO PROVIDE A SEARCH SERVICE TO A PROCESS CONTROL SYSTEM

FIELD OF THE DISCLOSURE

This disclosure relates generally to process control systems, and, more particularly, to systems, methods, and articles of manufacture to provide a search service to a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers execute and coordinate control strategies or routines using the field devices via the buses and/or other communication links communicatively coupling the field devices.

Information from the field devices and the controllers may be made available to one or more applications (i.e., routines, programs, etc.) as runtime data executed by the operator workstation (e.g., a processor-based system) to enable an operator to perform desired functions with respect to the process. Some of these functions may include viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Additionally, the application stations and/or the operator workstations may access process documentation, event information, alarm information, and/or help files that describe various aspects of a process control system. Each of these different types of information may be stored in a separate database. In some instances, search functions may be used by an operator to search a database for a desired document and/or information. However, because the different types of documents are stored at different locations and/or databases within the process control system, an operator may have to search multiple databases for information regarding a topic, field device, and/or type of information.

SUMMARY

Systems, methods, and articles of manufacture to provide a search service to a process control system are described below. An example system to provide a search service to users of a process control system includes a search database to store a set of searchable items associated with a process control system and to store a search profile associated with a selected query result. The system also includes a publisher to collect information associated with the searchable items from the process control system and to publish the collected information to the search database, and a searcher to receive a request including the search profile and a query of the searchable items in the database, to search the searchable items based on the query, and to return at least a portion of the collected information based on the search profile.

An example method to provide a search service to users of a process control system includes monitoring a process control system for first information associated with a plurality of searchable items, publishing the first information to a search database, receiving a request from a requester including a query of the searchable items and specifying a search profile, generating a response comprising second information associated with the searchable items based on the query and the search profile, and transmitting the response to the requester.

DETAILED DESCRIPTION

Figure 1:
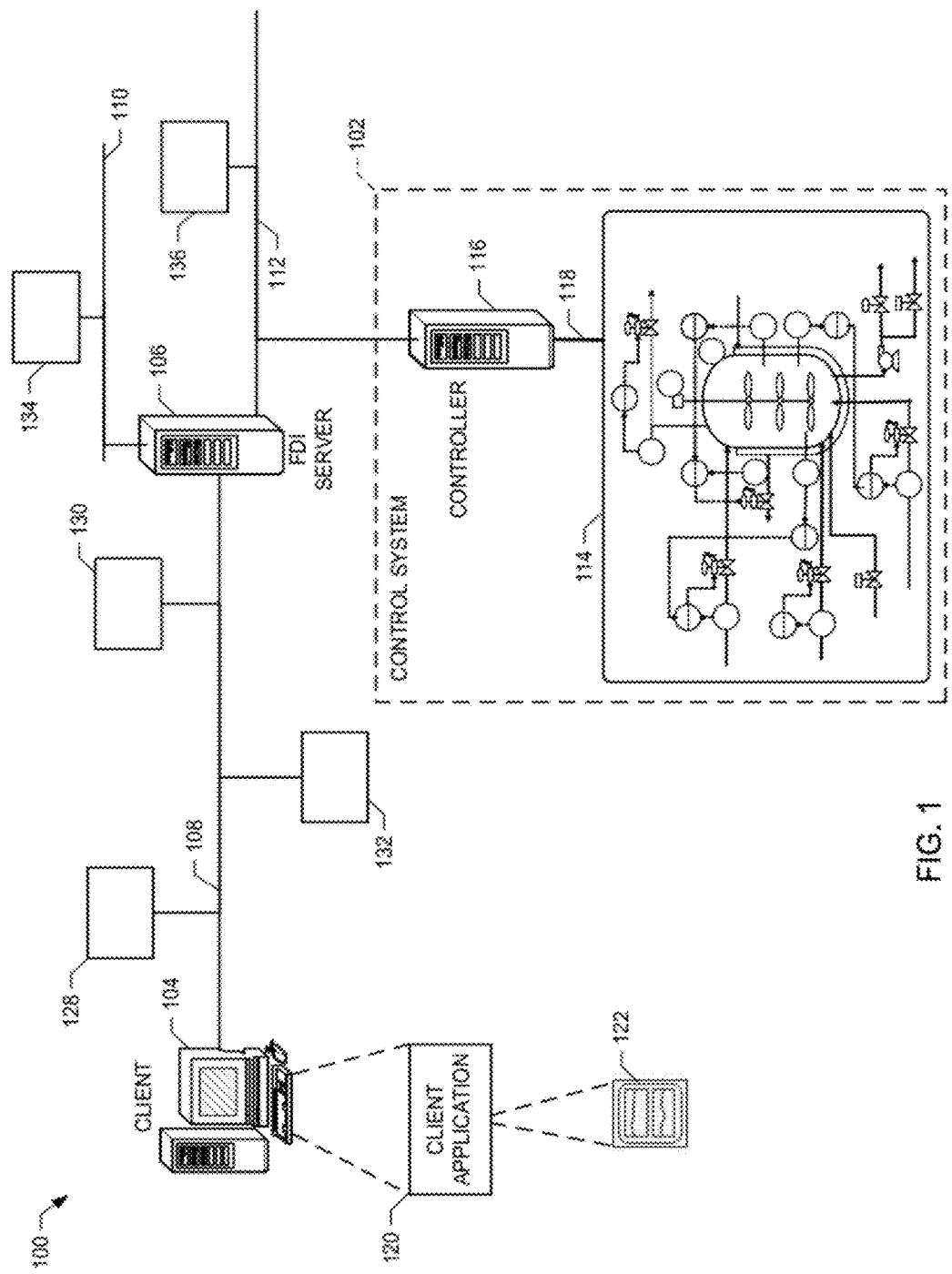
FIG. 1 is a block diagram illustrating an example process control system including a field device integration server to provide a search service.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with managing process control search results, the example method and apparatus are more generally applicable and may be implemented to manage search results for any automation system, batch processing system, manufacturing system, industrial control system, safety instrumented system, etc.

The example systems, methods, and articles of manufacture described herein may be used to provide a search service to users of a process control system. In some examples, the process control system uses the field device integration (FDI) standard. Some example search services include publishers and a search engine. In some examples, the publishers collect information associated with a set of searchable items from the process control system and publish the collected information to the search databases. Some example search engines receive requests that include a query of searchable items in the example search database(s), search the set of searchable items in the search database(s) based on the query, and return at least a portion of the collected information based on a search profile.

Some example searchable items that may be published and/or searched include manufacturer data, displays of portions of a process control system, data trends of devices and/or applications in the process control system, operator notes about devices and/or applications in the process control system, datasheets for devices, alarms and/or alerts generated by devices in the process control system, documents for devices and/or applications in the process control system, diagnostics from devices in the process control system, logs generated by devices and/or applications in the process control system, and/or any other types of searchable items in the process control system.

Some example systems, methods, and articles of manufacture described below use search profiles to allow users to customize and improve search results. In some examples, a user of the process control system may create, edit, and/or delete a search profile, including selecting one or more types of search results, append search terms to a search query, weight search results based on historical search queries, and/or delete historical search queries from the search profile. When a user performs a search using a search profile, the search query entered by the user may be modified according to the search profile and/or the example search engine returns particular types of search results based on the desired search results specified in the search profile. In some examples, the search engine updates the search profile based on the search query entered by the user and/or the search results selected by the user. Updating the search profile may include, for example, weighting search results based on selections of the user and/or weighting search terms based on historical search queries.

FIG. 1 is a block diagram illustrating an example process control system 100 including a FDI server 106 to provide a search service to the process control system 100. The example control environment 100 may include additional clients (not shown) that may be communicatively coupled to a control system 102 and/or other control systems (not shown).

A client 104 (e.g., a terminal, a workstation, a personal computer), the example control system 102, and/or the field device integration (FDI) server 106 communicate using an FDI standard. The FDI server 106 interfaces devices on different networks operating using different standards, including HART, Foundation Fieldbus, and/or Profibus. In general, FDI provides specifications to allow device manufacturers and/or suppliers to build tool sets that can be used by customers to uniformly manage devices, regardless of the standard to which the devices were originally intended and/or built. FDI includes a textual device description method that allows a text-based file (e.g., an XML file) in a standard Electronic Device Description Language (EDDL) to describe a device, methods provided by the device, measurement and device parameters supported by the device, configuration information for the device, and/or interactions that users can have with the device.

FDI further provides a standard method for applications and/or devices to communicate. The communication method resembles that of a message bus that sends and receives messages via communication channels. The message bus method allows applications, controllers, servers, and/or devices to interact without necessarily knowing all of the specific details about the internal operations of the receiving application or device. In addition to the message bus approach, FDI provides features for a service-oriented method of requesting services from applications, controllers, servers, and/or devices. Under such a service-oriented method, applications, controllers, servers, and/or devices expose and consume functionality using contracts and messages. The service method may be used by applications, controllers, servers, and/or devices to negotiate, allocate, deallocate, limit, manage, and diagnose system resources and/or behavior.

The example client 104 and the example FDI server 106 are in communication via a first communication bus 108. The FDI server 106 connects the communication bus 108 to other communication buses 110, 112, which may be of the same type or of different types than the communication bus 108. The FDI server 106 is also in communication with the control system 102 via the communication bus 112. Thus, the client 104 may communicate with any of the devices in the control system 102 via the FDI server 106 and the appropriate communication buses 108 and 112.

In some examples, the communication buses 108-112 may be implemented to be compliant with the Foundation Fieldbus protocol, the Profibus protocol, and/or the HART protocol.

The example control system 102 may include any type of manufacturing facility, process facility, automation facility, and/or any other type of process control structure or system. In some examples, the control system 102 may include multiple facilities located at different locations. Additionally, although the example control system 102 is associated with a process control subsystem 114, the control system 102 may include additional process control systems.

The example process control subsystem 114 is communicatively coupled to a controller 116 via a data bus 118. The process control subsystem 114 may include any number of field devices (e.g., input and/or output devices). The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure portions of a process. The input devices may receive instructions from the controller 116 to execute a specified command and cause a change to the process. Furthermore, the output devices may measure process data, environmental data, and/or input device data and transmit the measured data to the controller 118 as process control information (e.g., process data). This process data may include the values of variables (e.g., measured process variables and/or measured quality variables) corresponding to a measured output from each field device.

In the illustrated example of FIG. 1, the example controller 116 may communicate with the field devices within the process control subsystem 114 via the data bus 118. The data bus 118 may be coupled to communication components within the process control subsystem 114. The communication components may include I/O cards to receive data from the field devices and convert the data into a communication medium capable of being received by the example controller 116. Additionally, these I/O cards may convert data from the controller 116 into a data format capable of being processed by the corresponding field devices. In an example, the data bus 118 may be implemented using the Fieldbus protocol or other types of wired and/or wireless communication protocols (e.g., Profibus protocol, HART protocol, etc.).

The controller 116 is communicatively coupled to the FDI server 106 via any wired and/or wireless connection. In some examples, the connection may include a firewall and/or other security mechanism(s) to limit access to the controller 116. The controller 116 may transmit process data to the FDI server 106 upon the controller 116 receiving the process data from the process control subsystem 114. In other examples, the controller 116 may transmit process data to the FDI server 106 at periodic time intervals (e.g., every minute, hour, day, etc.). Alternatively, the FDI server 106 may request process data from the controller 116.

Upon receiving the process data, the example FDI server 106 of FIG. 1 stores the process data within a file system (not shown). The file system may be arranged in a hierarchical manner with directories and/or sub-directories based on the devices within the process control subsystem 114 and/or based on a routine (e.g., application and/or algorithm) operating within the controller 116 to manage the process control subsystem 114. In other examples, the file system may be arranged by an operator of the control system 102. The process data may be stored to a parameter within the associated directory and/or sub-directory. In some examples, the parameter may be a variable associated with a routine operating on the controller 116 or associated with a field device output within the process control system 100. The parameter may include metadata that describes the type of process data associated with the parameter.

The example client 104 may be associated with an individual that may be authorized to read, write, and/or subscribe to process data associated with the process control system 100. The client 104 may also be associated with personnel associated with the control system 102 that may access the process control system 100 from a remote location. The client 104 may access the process control system 100 via the FDI server 106 using any wired and/or wireless communication medium (e.g., the Internet).

In addition to providing interoperability features, the FDI server 106 provides the client 104 with a search service that may be used to rapidly retrieve desired data for a user of the client 104. As described in more detail below, the FDI server 106 may provide contextual search results, provide search results based on a search profile associated with the user or the client 104, update the search profile of the user or the client 104 based on a search query, modify search queries and/or search results based on historical searches, and/or provide other search features to enhance the usefulness of the search service to a user of the client 104.

The example FDI server 106 is capable of formatting the process data such that the process data is viewable by a user of a client application 120 operating on the client 104. The example of FIG. 1 shows the client application 120 displaying process data in an interface 122. For example, the client application 120 may include a web client display application. The FDI server 106 may format process data for a web server application by creating a webpage and/or accessing a template webpage and placing or embedding the data fields within the webpage. The interface 122, via a web browser, may then display the process data by accessing the webpage hosted in the FDI server 106 using html requests and responses. Alternatively, the FDI server 106 may format the process data for a client display application by initializing a web application (e.g., ActiveX, Adobe Flash™ and/or Silverlight™) at the client application 120 that may be executable within a web browser (e.g., the interface 122) or may be native to the client 104 (e.g., a Windows® operating system application, an application plug-in).

In some examples, the client 104 may download and/or install the client application 120 prior to performing a search. The FDI server 106 transmits search results to the client application 120. In some examples, the FDI server 106 associates the process data with the corresponding data fields prior to transmitting the process data to the client application 120. Upon receiving the process data, the client application 120 creates (e.g., renders) a display within the web browser (e.g., the interface 122) to view the process data within the corresponding data fields.

The client 104 may customize a search profile by specifying types of results to be searched using a later-specified search query, automatic additions to search queries, return format of search results, and/or any other modifications to search results to fit a preferred search pattern. For example, the client 104 may specify a location within the web browser to display a data field. The search profile may be specific to the client 104 and/or to the user of the client 104. For example, an operator may use a different search profile than a technician or an engineer, but the client 104 may have a different search profile for users of the client 104 regardless of the roles of the users in the process control system.

The FDI server 106 may further update search results based on data received from other devices 128, 130, 132, 134, 136 on the communication buses 108-112. The example devices 128-136 may include workstations, terminals, controllers, communication network drop nodes, communication devices (e.g., modems, network gateways) and/or any other types of input, output, and/or control devices.

Figure 2:
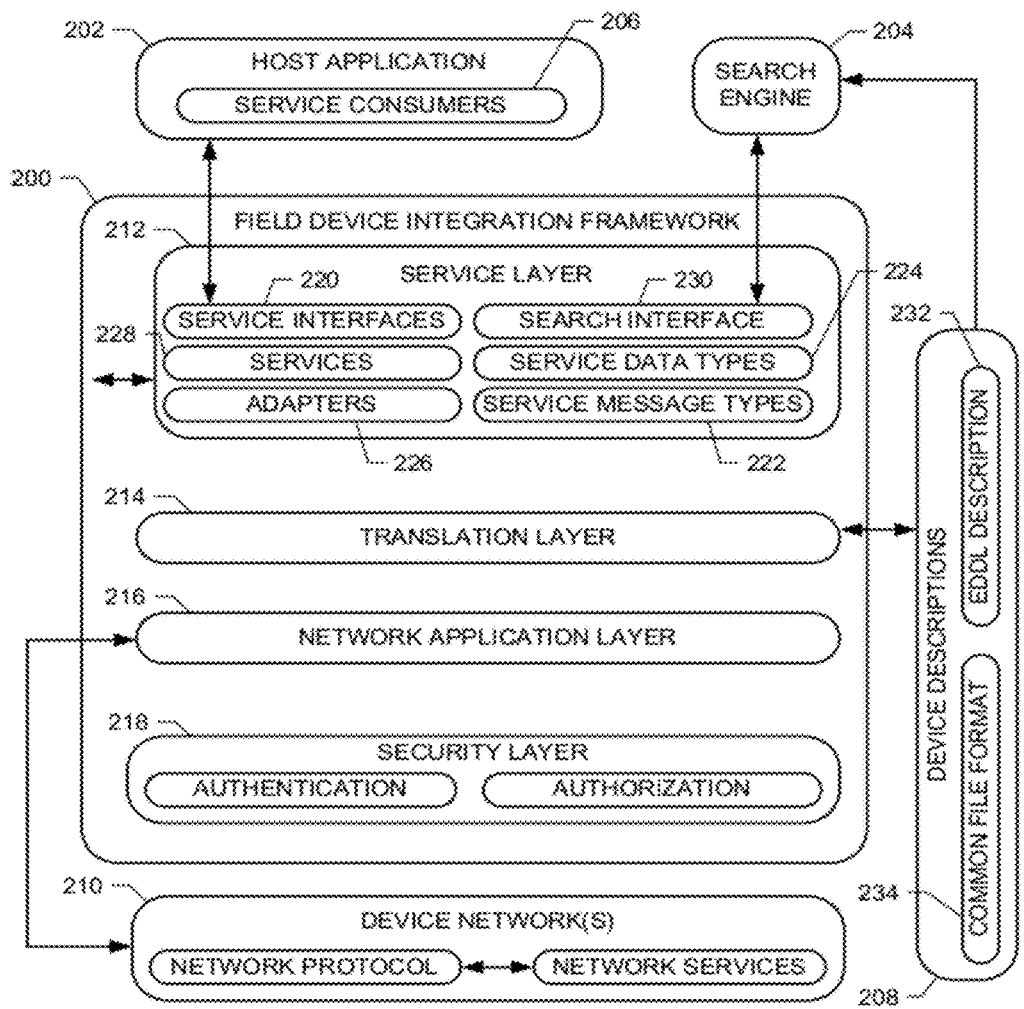
FIG. 2 is a block diagram of an example field device integration framework that may be used to implement the example field device integration server of FIG. 1.

FIG. 2 is a block diagram of an example service-oriented framework 200 that may be used to implement the example FDI server 106 of FIG. 1. The example service-oriented framework 200 provides a service-oriented architecture to improve the flexibility of a process control system (e.g., the process control system 100 of FIG. 1). As illustrated in FIG. 2, the service-oriented framework 200 is in communication with a host application 202, a search engine 204, device descriptions 208, and one or more device networks 210. The service-oriented framework 200 includes a service layer 212, a translation layer 214, a network application layer 216, and a security layer 218.

The example host application 202 of FIG. 2 is an application for configuring devices, an application for performing device calibration and diagnostics, and/or an application for reading measurement values and events from devices located in one or more device networks. As illustrated in FIG. 2, the host application 202 includes service consumers 206, which may request and consume services from the service layer 212. The host application 202 may be implemented using computer-readable instructions executed on, for example, the example client 104 of FIG. 1 and/or the example computer 1000 of FIG. 10. The host application 202 communicates with the device network(s) 210 via the service-oriented framework 200. Accordingly, the example service-oriented framework 200 and/or selected portions of the framework 200, may be implemented on each of the client(s) 104, server(s) 106, controller(s) 116, and/or device(s) 128-136 on the device networks 108, 110, and 112.

The service layer 212 includes service interfaces 220, service message types 222, service data types 224, adapters 226, and services 228 including a search interface 230. In addition to the search interface 230, example services 228 provided by the service layer 212 include access to the device descriptions 208 and the device network(s) 210. The services 228 are exposed as service contracts, which allow applications and/or devices to request the services 228 to execute desired capabilities or functions. Changes to the service contracts to include new functions implemented by a service, and the new message and data types are not backward compatible with the existing contracts.

The service layer 212 is accessed through the service interfaces 220. The service layer 212 manages service requests from applications and/or devices and translates service contracts for use by the host applications. When passing messages between a service and a service consumer, one or more adapters 226 may be used to transform the messages into formats that the respective service consumers can understand.

Access to the service layer 212 is defined by policies. Policies provide a way for the service consumers to determine the types of connections, any security requirements for accessing services, and/or any other details related to requesting services.

The translation layer 214 translates between the FDI-based protocol and device network-specific protocols (e.g., e.g. HART, Fieldbus, Profibus). The example translation layer 214 receives information about devices from the device description files 208. The device description files 208 include the information about devices in an electronic device description language (EDDL) 232 and/or in a common file format 234. The EDDL files 232 represent textual descriptions generated by the respective manufacturers of the devices 128-136 of FIG. 1. The EDDL files 232 resemble digital datasheets of the devices 128-136. Compared to conventional programming languages, the flexibility of EDDL elements is limited and specific to device description. On one hand, the simplicity of the EDD language allows for easy and efficient development of EDD device descriptions, provides independence from hardware and operating system platforms, results in a uniform philosophy for device operation, and yields high robustness through interpretation. EDDL technology may be advantageously used for devices with low to average complexity.

The common file format 234 stores information about devices and/or applications, and the files may be exchange between systems, tool sets, applications, and/or other devices. In some examples, the common file format 234 uses a schema that includes extensible markup language (XML) which is flexible and allows virtually unlimited description using tags.

The network application layer 216 includes data access functionality to interact with one or more of the device networks 108-112 of FIG. 1. The example framework 200 may include multiple network application layers 216, each of which is specific to a particular device network such as HART, Fieldbus, and Profibus. Accordingly, the example framework 200 and the network application layer 216 do not require any changes to these protocols.

The device networks 210 provide the example framework 200 with the ability to configure devices, access device diagnostics, transfer measurement values, transfer alarms and events, and/or other communication and control capabilities. Some example capabilities supported by the service-oriented framework 200 include requests and/or responses, publishing and/or subscribing, transmitting events, maintaining a directory of applications and/or devices, and/or writing commands to devices. The service-oriented framework 200 provides the host application 202 with access to these capabilities via the service layer 212. For example, the service-oriented framework 200 may have services defined for request/response, publish/subscribe, events, directory, and write capabilities.

In an example of operation, the host application 202 generates a request to read a device parameter such as a pressure reading from a pressure transmitter device on a device network. If the device network is a HART network, the host application 202 sends a command to the pressure transmitter device. In contrast, if the device network is a Fieldbus network, the host application 202 reads or requests an object-dictionary entry. Using the FDI standard, the example host application 202 makes a request in a generic (e.g., standard) format to read the pressure from the pressure transmitter device. Upon receiving the request, the service layer 212 transfers the request to the translation layer 214. The translation layer 214 generates a command specific to the device network to which the pressure transmitter device is connected and transmits the command via the network application layer 216. The device network transports the request to the pressure transmitter device and returns the response from the device to the translation layer 214 via the network application layer 216. The translation layer 214 then converts the response to the standard response format that is understandable by the host application 202. In some other examples, the host application 202 requires a specific format for the response. In these cases, the host application 202 may request that a specific adapter 226 be invoked when the response is returned to the host application 202.

In some cases it may be necessary to restrict access to the device networks. To support this requirement the service-oriented framework 200 includes the security layer 218 to provide authentication and/or authorization. The implementation of authentication may be dependent on the type of service host that is being used. Thus, service-oriented framework 200 allows one or more security layers to be plugged in. For example, if the service-oriented framework 200 is hosted in Internet Information Services (IIS), the authentication support provided by IIS is used. If the service is hosted by a Windows Service, a message-based or transport-based authentication is used.

In some examples, the service-oriented framework 200 provides authorization of user access. In these cases an authorization module can be plugged in to provide access permissions on resources for users, groups, and roles.

Figure 3:
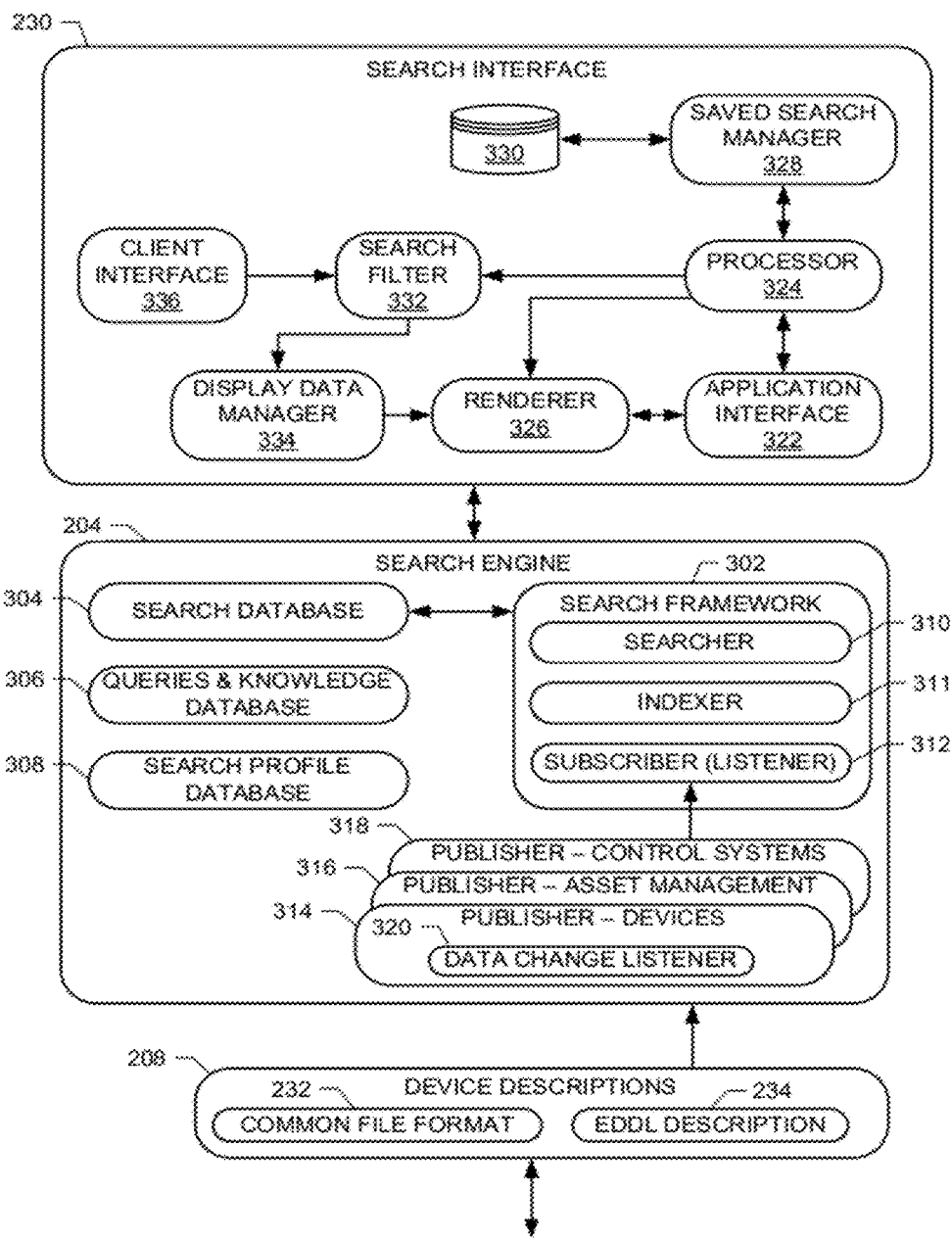
FIG. 3 is a more detailed block diagram of the example search engine and the example search interface of FIG. 2.

FIG. 3 is a more detailed block diagram of the example search engine 204 and the example search interface 230 of FIG. 2. The example search engine 204 and/or the example search interface 230 may be implemented using the example FDI server 106 of FIG. 1, one or more other servers coupled to any of the communication buses 108-112, and/or the computer system 1000 of FIG. 10.

The example search engine 204 of FIG. 2 includes a search framework 302, a search database 304, a queries and knowledge database 306, and a search profile database 308. The example search framework 302 includes a searcher 310, an indexer 311 and a subscriber (e.g., a listener) 312. The example search engine 204 also includes a devices publisher 314, an asset management publisher 316, and a control systems publisher 318. However, the search engine 204 may include additional and/or alternative publishers to the illustrated publishers 314-318. In some examples, the publishers 314-318 may be created and/or eliminated based on the creation of search profiles. When a search profile that specifies devices for return in the search results is created, a new publisher is created that publishes the types of search results selected in the search profile. In some examples, a search profile may activate the device publisher 314 when a search profile is specified during a search. In response, in some other examples, the publishers 314-318 may be merged into a universal publisher, which is accessed by the search engine 204 for any search profile.

The publishers 314-318 publish collected information to the relevant database(s) 304-308. For example, the control systems publisher 318 may publish data collected from a process control device to the search database 304. Similarly, the devices publisher 314 may publish manufacturer-provided documents and a list of services to the queries and knowledge database 306.

The example publishers 314-318 each include a data change listener such as the data change listener 320 included in the device publisher 314. The data change listener 320 listens or monitors for changes to data, device information, control information, or other data changes depending on which of the publishers 314-318 is implementing the data change listener 320. For example, the data change listener 320 in the device publisher 314 may monitor the device descriptions 208 (e.g., description files in a common file format 232, description files in the electronic device description language 234) for new devices, for updates to existing devices, and/or for removal of existing devices from the device descriptions 208. In other examples, the data change listener 320 in the control systems publisher 318 listens or monitors data and/or commands transmitted by devices (e.g., the devices 128-136 of FIG. 1) and/or by applications (e.g., the client application 120).

To collect data and/or information, the example publishers 314-318 may listen to the communication buses 108-112 for messages passed between the devices 128-136, the client application 120, and/or the controller 102. Because of the message bus structure used by the example process control system 100 of FIG. 1, the FDI server 106 (and/or a search server (not shown)) may read any messages passed along the respective communication buses 108-112 to which the FDI server 106 is connected. Thus, the FDI server 106 (e.g., via the publishers 314-318) may be configured to snoop data and/or device information on the message bus. Additionally or alternatively, the devices 128-136, the client application 120, the control system 102, and/or the FDI server 106 may be configured to periodically and/or aperiodically provide operational data, control data, alert and/or alarm data, trend data, device diagnostics, and/or any other type of device and/or application information.

To perform searches based on search parameters entered by a user of the client 104 (e.g., via the interface 122), the service-oriented framework 200 (e.g., via the search interface 230) accesses the searcher 310. The example searcher 310 receives one or more search parameters and/or a search profile from a processor 324 via an application interface 322. The application interface 322 is an interface through which the client application 120 of FIG. 1 and/or the host application 202 of FIG. 2 may access the search service provided by the service-oriented framework 200. The search engine 302 also receives display context information associated with the search parameters from the processor 324.

The searcher 310 accesses the search database 304 and matches the search parameters to indexed process control information. For example, the searcher 310 matches the search parameters by determining which of the search parameters are included within an index of process control information. The searcher 310 may also match the search parameters using the display context information as an additional search parameter. For example, if a display context indicates search parameters were generated in a schematic diagram, the searcher 310 searches for indexed process control information associated with schematic diagrams in addition to searching for indexed process control information that matches the search parameters.

The example searcher 310 may match search parameters to indexed process control information based on search parameters provided by a user. For example, a user may specify to match search parameters as an entire phrase. In that case, the searcher 310 searches the search database 304 for indexed process control information that matches the entire phrase. In other examples, search parameters may list words that are to be excluded from a search. The example searcher 310 then matches indexed process control information that does not include the excluded words. The example searcher 310 may also use other search parameters to conduct a search including, for example, numerical expressions and/or logical connectors.

When the searcher 310 matches control parameters to indexed process control information, the searcher 310 stores the matched process control information to a search results list as a search result. The matched process control information includes a link to the corresponding source information and/or the runtime data within the search database 304. The matched process control information may also include the indexed process control information. The searcher 310 adds search results to the search result list until the searcher 310 has completed a search of the index(es) within the search database 304.

The example searcher 310 determines a percent match value for each of the search results based on a calculation of how well the search parameters match the indexed process control information (e.g., a relevance calculation). The searcher 310 uses the percent match value to rank and/or order the search results so that the most relevant search results are displayed first. In other examples, the searcher 310 may display the most accessed search results first and/or may display a combination of the most accessed and the most relevant search results first. In some examples, the searcher 310 ranks and/or orders search results as they are matched. In other examples, the searcher 310 ranks and/or orders search results upon completing a search of the search database 304.

Upon ranking and/or ordering search results, the searcher 310 transmits the search results to a search filter 332. The example search filter 332 filters (and/or parses) the search results based on filter conditions received from the processor 324. The example filter conditions are associated with a job function of a user, a span of control associated with a user, security access of a user, privileges granted to a user, and/or an identifier associated with a user. The filter conditions are used by the search filter 332 to ensure that a user may not view information that is not relevant to the user and/or that a user is not authorized to view.

The indexer 311 indexes data and/or device information in the databases 304-318. To determine which of the runtime data is to be indexed, the example indexer 311 uses a rule set, which may be provided by process control personnel. The indexer 311 uses control parameters specified within the rule set to identify which of the control parameters associated with the received runtime data are to be indexed. For example, the rule set may indicate that a PUMP01 control parameter is to be indexed. Because the subscriber 312 receives the runtime data within a message that includes the PUMP01 control parameter, the indexer 311 is able to determine that the PUMP01 control parameter is to be indexed. To index the runtime data associated with the PUMP01 control parameter, the indexer 311 parses the runtime data from the message and forwards the PUMP01 control parameter and the associated runtime data to the search database 304.

In some examples, process control personnel may decide to index all process control data. In these examples, the subscriber 312 forwards all received runtime data to the indexer 311. In other examples, process control personnel may decide to index only process control data associated with field device outputs. In these other examples, the process control personnel may define a rule set to include a list of control parameters associated with the field device outputs. The subscriber 312 then accesses this rule set to match control parameters associated with the received runtime data to control parameters specified within the rule set. The subscriber 312 forwards the matching control parameters and associated runtime data to the indexer 311. In yet other examples, the subscriber 312 may receive updates from the search interface 230 indicating which control parameters have been included within search results. The subscriber 312 then updates the rule set so that only relatively recent searches for control parameters and associated runtime data are indexed. Further, a time limit for indexing recently accessed control parameters may be specified by process control personnel.

To index runtime data, the search framework 302 includes the indexer 311. The example indexer 311 receives runtime data and corresponding control parameter(s) from the subscriber 312 and updates search records via an index stored within the search database 304. Within the search database 304, the control parameter(s) may be used as descriptors, thereby making the runtime data accessible. To index the runtime data, the indexer 311 identifies the control parameter(s) associated with the runtime data and stores the control parameter(s) to a searchable index stored within the search database 304. Additionally, the indexer 311 stores the runtime data associated with the stored control parameters to the index. The indexer 311 may use any type of data compression and/or document parsing (e.g., tokenization), which is also sometimes called word boundary disambiguation, tagging, text segmentation, content analysis, text analysis, text mining, concordance generation, speech segmentation, lexing, and/or lexical analysis) to index runtime data and/or corresponding control parameters.

By storing the runtime data and the control parameters to the index, the searcher 310 may include control parameters within search results. The searcher 310 may also display the runtime data stored within the index that corresponds to the displayed control parameters. In this manner, search results returned by the searcher 310 include indexed runtime data. Because the indexer 311 indexes runtime data as the subscriber 312 receives the runtime data, the runtime data displayed as search results is substantially the most recent generated runtime data. Thus, users viewing search results can view the most recent process control information within the search results without having to open another application to view the process control information separate from the search results and/or the initial search context.

The example indexer 311 may also overwrite runtime data with relatively more recent runtime data within an index in examples where runtime data is stored to the index. In this manner, the indexer 311 updates the index with the most recent runtime data. The indexer 311 may also transmit a message to the searcher 310 indicating runtime data has changed and/or been updated. As a result, any runtime data that is displayed within search results may be updated with the more recent runtime data as the indexer 311 stores the runtime data to the index.

In addition to indexing runtime data, the example indexer 311 indexes source information. The example indexer 311 indexes source information that may be stored throughout the process control environment 100. In this manner, the indexer 311 creates a searchable index stored within the search database 304 for source information stored in different locations (e.g., the device descriptions 208) of the process control environment 100. In other examples, the indexer 311 may create an index for each of the device descriptions 208 and/or types of source information based on preferences of process control personnel. In these examples, the indexer 311 stores the multiple indexes to the search database 304 so that the search interface 230 only has to access the search database 304 to perform a search. Further, the indexer 311 indexes source information periodically (e.g., hourly, daily, weekly, etc.) based on requirements of process control personnel.

The indexer 311 of FIG. 3 may additionally or alternatively index device information using a crawler and/or a search spider to identify device information within the device descriptions 208 and store portions and/or all of the device information to an index. The indexer 311 may use any type of data compression and/or document parsing to index device information. The indexed portions of the device information are displayed by the search interface 230 as search result items. The portions of the device information may include, for example, a title of a document and/or information, key words or phrases associated with and/or embedded within a document and/or information, the devices 128-136 of FIG. 1 and/or control parameter(s) referenced by a document and/or information, authorized viewers of a document and/or information, and/or an area of the process control system 100 associated with the document and/or information. Further, the indexer 311 may determine a type of document and/or information and store the type to the index. By storing portions and/or complete copies of the source information to an index within the search database 304, the searcher 310 may match search parameters to the portions of the source information. Further, by storing a type of a document and/or information to an index, the searcher 310 may use the type to perform in context based searches for specific types of documents and/or information.

FIG. 3 further shows a more detailed block diagram of the example search interface 230. The example search interface 230 receives search parameters from a user and provides search results that at least partially match the search parameters. The example search interface 230 also manages saved (e.g., offline) search results, filters search results based on conditions, and/or manages the display of search results based on a context of a search.

To receive search parameters from a user, the example search interface 230 includes the application interface 322. The example application interface 322 is communicatively coupled to and/or included within the client 104 of FIG. 1 (e.g., in the client application 120). The application interface 322 is also communicatively coupled to the user interface 122 of FIG. 1. In some examples, the application interface 322 is operatively coupled to search boxes and/or functions included within the user interface 122. When search parameters are entered into a search box and/or selected via a search function in the user interface 122 by a user, the example application interface 322 receives the search parameters. In some examples, the search parameters may be provided by applications operating within the user interface 122.

Additionally, the application interface 322 receives filter conditions provided by a user via the user interface 122. In some examples, filter conditions are included in a selected search profile. The filter conditions are used by the search interface 230 to filter and/or parse search results. In some examples, search results may be filtered based on user information and/or areas of the process control system 100 accessible to a user. Filter conditions may also include a job function of a user, a span of control associated with a user, security access of a user, privileges granted to a user, and/or an identifier associated with a user. The filter conditions received by the application interface 322 ensure that a user may not view information that is not relevant to the user and/or that a user is not authorized to view. Upon receiving search parameters and/or filter conditions from the user interface 122 and/or applications displayed by the user interface 122, the example application interface 322 forwards the search parameters and/or the filter conditions to a processor 324. In some examples, the application interface 322 may queue search parameters and/or filter conditions until the processor 324 is available to receive the search parameters and/or filter conditions.

The search parameters received by the application interface 322 include, for example, text and/or context information. Text may include words or phrases entered by a user into a search field (e.g., text box) of the user interface 122, identifiers (e.g., tags) of the field devices 128-136 of FIG. 1, operator and/or user information, date ranges, and/or any other information a user may specify to search for process control information. Context information may be generated by a user selecting graphical representations of process control information displayed within the user interface 122. For example, a user may search for process control information associated with a selected graphical representation of a VALVE01 field device displayed within a schematic of the process control subsystem 114. In this example, in-context information received by the application interface 322 may include a search parameter with the name of the VALVE01 field device and a search parameter indicating that the selection of the VALVE01 field device was in a schematic application. A search parameter may also include in-context information indicating the user selected to view search results of documents associated with the VALVE01 field device. Based on these search parameters received by the application interface 322, the searcher 310 may focus a search of the search database 304 on documents associated with the VALVE01 field device and/or documents associated with the schematic.

In another example, a user may select a function block in a functional block diagram. The example application interface 322 may receive search parameters from the user interface 122 indicating the selection occurred in a function block diagram, the name of the function block, and/or control parameters associated with the function block. These search parameters may be used by the searcher 310 to search for runtime data associated with the selected control parameters and/or documents describing the function block. Other examples of searches are described in conjunction with FIGS. 4-8.

Additionally, because the example application interface 322 communicatively couples the searcher 310 to the user interface 122 and/or applications displayed by the user interface 122, the application interface 322 transmits search results for display within the user interface 122. The search results include, for example, a list of process control information, process control items, and/or portions or indexed process control information. In other examples, the search results include graphical representations of process control information and/or control parameters with corresponding runtime data. The indexed source information and/or runtime data may be displayed graphically as search results by the user interface 122 in a preview panel and/or within a search results panel.

The example processor 324 of the illustrated example determines a display context of in-context information from the received search parameters. The processor 324 determines a display context so that search results can be displayed to a user in a graphical representation that corresponds to a context from which the user initiated a search. The processor 324 determines the display context by, for example, matching a display context to a type of an application from which a search was initiated, a data type selected to be searched from within the application, and/or a data type of control parameters selected to be searched. The processor 324 may also determine the display context based on in-context information included within search parameters, and/or filter conditions.

Upon determining a display context for search results, the processor 324 transmits the determined display context to a renderer 326. The example renderer 326 uses the display context for generating a graphical representation of corresponding search results for display within the user interface 122. The processor 324 also transmits the display context to the searcher 310. The processor 324 transmits the display context in a message and/or instruction. Additionally, the processor 324 transmits search parameters, filter conditions, and/or in-context information to the searcher 310. Additionally, the example processor 324 may transmit alternate spellings and/or provide recently entered search parameters to the application interface 322 for display within a search field in the user interface 122.

In the illustrated example of FIG. 3, the application interface 322 receives an instruction from the user interface 122 to store displayed search results. The instruction may include an identifier (e.g., a name) assigned by a user to store the search results. Upon receiving a search result store instruction, the application interface 322 forwards the instruction to the processor 324, which then accesses the searcher 310 for the search results. The processor 324 forwards the instruction to a saved search manager 328 that stores the search results and/or the identifier of the search to a search results database 330. The example search results database 330 stores the search results under the associated identifier. The example search results database 330 as well as the search database 304, the queries and knowledge database 306, and/or the search profile database 308 may be implemented by Electronically Erasable Programmable Read-Only Memory (EEPROM), Random Access Memory (RAM), Read-Only Memory (ROM), and/or any other type of memory.

By storing search results, a user of the client 104 and/or the client application 120 may access process control information that is listed within the stored search results. A user may store search results to store a collection of links that are associated with a particular process control item. For example, a user may search for documents associated with a PUMP01 field device. The displayed search results include links to source information within the search database 304 and runtime data within the runtime data memory. Instead of storing each of the documents and runtime information locally to the client 104, the user may store the search results, thereby storing links to the source information and/or runtime data. The user may then access the stored search results locally (e.g., offline) instead of performing another search for the same process control information.

The example saved search manager 328 of FIG. 3 also stores a copy of indexes within the search database 304 to the search results database 330. To save a copy of an index from the search database 304, the processor 324 receives an instruction from a user of the client 120 via the user interface 122. In other examples, the processor 324 may periodically (e.g., hourly, daily, monthly, etc.) access the search database 304. By accessing the search database 304, the processor 324 may copy index(es) and forward the copy to the saved search manager 328. The saved search manager 328 then stores the copy to the search results database 330. By storing a copy of index(es), the example saved search manager 328 enables a user to perform searches when the search database 304 is not accessible. When the search database 304 is unavailable, the example processor 324 accesses the copy of the backup index(es) within the search results database 330 via the saved search manager 328.

For example, a user of the client 104 providers an identifier to log into the client 104. When the user performs a search, the identifier may be transmitted to the application interface 322 as a search parameter and/or may be embedded within search parameters and/or display context information as metadata. The processor 324 may extract the identifier from metadata and forward the identifier to the search filter 332. The search filter 332 then determines, for example, a zone of control associated with the identifier and/or a job function associated with the identifier. The search filter 322 then removes from the search results any search results that are not associated with the job function and/or zone of control. Further, the search filter 322 may access security credentials (e.g., via the security layer 218 of FIG. 2) to determine which of the search results the identifier may access. The search filter 322 then forwards the search results that have not been removed to a display data manager 334.

The example display data manager 334 manages process control information that is displayed as search results within an application shown by the user interface 122. The display data manager 334 stores to a local cache control parameters associated with runtime data included within the search results and/or stores link(s) to source information included within the search results. The display data manager 334 then forwards the search results to the renderer 326. Further, the display data manager 334 periodically (e.g., every second, minute, five minutes, ten minutes, etc.) and/or aperiodically (e.g., on demand) accesses the search database 304 to determine if any of the indexed runtime data and/or source information displayed as search results has changed. If any of the indexed process control information has changed, the display data manager 334 updates the search results with the changed information and transmits the changed information to the renderer 326. In other examples, the display data manager 334 receives a message from the publishers 314-318 indicating runtime data has changed. In this manner, the display data manager 334 updates displayed search results as process control information changes within the process control system 100. As a result of updating the process control information, the display data manager 334 enables a user to view the most recent process control information within a search result context.

The example display data manager 334 may also access runtime data displayed within search results by accessing the search database 304. The display data manager 334 may use control parameters associated with the runtime data to locate the runtime data within the search database 304. If the display data manager 334 determines that at least some of the runtime data has changed, the display data manager 334 updates the corresponding search result(s) and transmits the updated search result(s) to the renderer 326.

Further, the example display data manager 334 may access the search database 304 to determine if a new revision of source information listed within a search result has been stored. If the display data manager 334 determines that a new revision has been stored and/or that the source information has otherwise changed, the display data manager 334 updates the search results with the changed source information and forwards the changed source information to the renderer 326. The renderer 326 may then update the displayed search results with the changed source information.

Additionally or alternatively, the example display data manager 334 of FIG. 3 sends an instruction to the searcher 310 to determine if any of the runtime data and/or source information displayed within search results has changed. Upon receiving the instruction, the searcher 310 accesses the search database 304 to determine if any of the indexed process control information has changed. If the indexed process control information has changed, the search engine 204 forwards the changed information to the display data manager 334.

The example renderer 326 creates a displayable version of (e.g., renders) search results received from the display data manager 334. The renderer 326 creates the displayable search results using display context information received from the processor 324 and/or based on a type of the process control information listed within the search results. The renderer 326 uses the display context information to select a display template for the search results. For example, if the display context is associated with a functional block diagram (e.g., the search was initiated from a functional block diagram), the renderer 326 may select a template with an embedded application that can display the search results as functional blocks. In another example, if the renderer 326 receives display context information associated with a field device (e.g., the field device was selected in a schematic or layout of the process control system 100), the renderer 326 may select a template that can display graphical representations of runtime data (e.g., values, charts, graphs, etc.).

The example renderer 326 may also use a type of the process control information included within the search results to determine how to display the search results. For example, the renderer 326 may display process control information associated with a schematic file format listed within search results in an application that can display schematic files. In other examples, the renderer 326 may receive an instruction from a user of the client 104 to display the search results as a list. In this manner, the search results are displayed in a context of the listed process control information. In a similar manner, process control information associated with a document file format may be displayed by the renderer 326 in a word processing application.

Alternatively, the renderer 326 may display search results as a list based on display context information and/or based on a type of the search results. For example, if the search results are associated with different types of process control information, the renderer 326 may display the search results as a list. The renderer 326 may also generate a preview panel showing a selected search result in a context of the file type.

Further, the example renderer 326 displays selected process control information in an associated application. For example, a user may select a search result that corresponds to a word processing document stored in the search database 304. In this example, the example application interface 322 forwards the selection to the processor 324, which accesses the search database 304 for the selected word processing document using a link within the search result. The processor 324 then transmits the document to the renderer 326. The renderer 326 determines the document is a word processing document, opens a word processing application within the user interface 122, and displays the document within the word processing application. The display data manager 334 may also provide an indication to the user when a changed version of the opened document is stored in the search database 304.

Further, the renderer 326 may use filter conditions to determine how to display the search results. For example, the renderer 326 may select an operator interface template when an identifier of a user of the client 104 is classified as an operator. In a similar manner, the renderer 326 may display the search results in an enterprise application if the identifier is classified as a designer and/or an engineer. The renderer 326 receives the filter condition from the processor 324 and/or the search filter 332. Additional examples of displaying search results based on filter conditions and/or display contexts are described in conjunction with FIGS. 4-8.

The example renderer 326 of the illustrated example transmits the generated displayable search results to the user interface 122. The user interface 122 displays the search results within the client 104 viewable by a user. In some examples, a user may select to preview a displayed search result. In these examples, the application interface 322 receives an instruction from the user interface 122 of the selected search result and forwards the instruction to the renderer 326. The example renderer 326 then generates a display for the selected search result based on a type of process control information associated with the search result and/or based on a context type of the displayed search results. In some examples, the renderer 326 may use the indexed process control information included within the search results to display the process control information in a preview panel. In other examples, the renderer 326 may access the search database 304 for the corresponding process control information of the selected search result if the indexed process control information included within the search result is insufficient to generate the display. The renderer 326 than transmits the graphical display of the selected search result to the application interface 322 for display within the user interface 122.

In addition to searching the search database 304, the example search interface 230 of FIG. 2 includes a client interface 336 to search other clients within the process control environment 100 of FIG. 1. The example client interface 336 searches other clients by performing a file and/or folder search of a memory within the clients. The client interface 336 also searches the client 104 that includes the user interface 126 that initiated the search. In this manner, a user may search for process control information substantially anywhere within the process control environment 100, including the client 104 of the user.

The example client interface 336 of the illustrated example receives search parameters from the search engine 204 and searches communicatively coupled clients for process control information that matches the control parameters. The client interface 336 searches for control parameters associated with runtime data and/or source information that matches the search parameters. The client interface 336 enables a user to search for process control information that may be stored locally in a client but which has not yet been stored to the search database 304. The client interface 336 may also provide the search engine 204 a list of recently accessed search results. The search engine 204 uses the list from the client interface 336 to rank and/or order search results based on which of search results have been accessed recently. Additionally or alternatively, the client interface 336 may function as an interface for the search engine 204 to search other clients.

Upon searching other clients, the example client interface 336 of FIG. 3 transmits the matching search results to the search engine 204. The example search engine 204 then incorporates the search results from the client interface 336 with the search results from the search database 304. Further, the search engine 204 may place an indication adjacent to the search results that are stored on other workstations. A user may view the indication in the search results and know that the corresponding search result is stored on another workstation.

Figure 4:
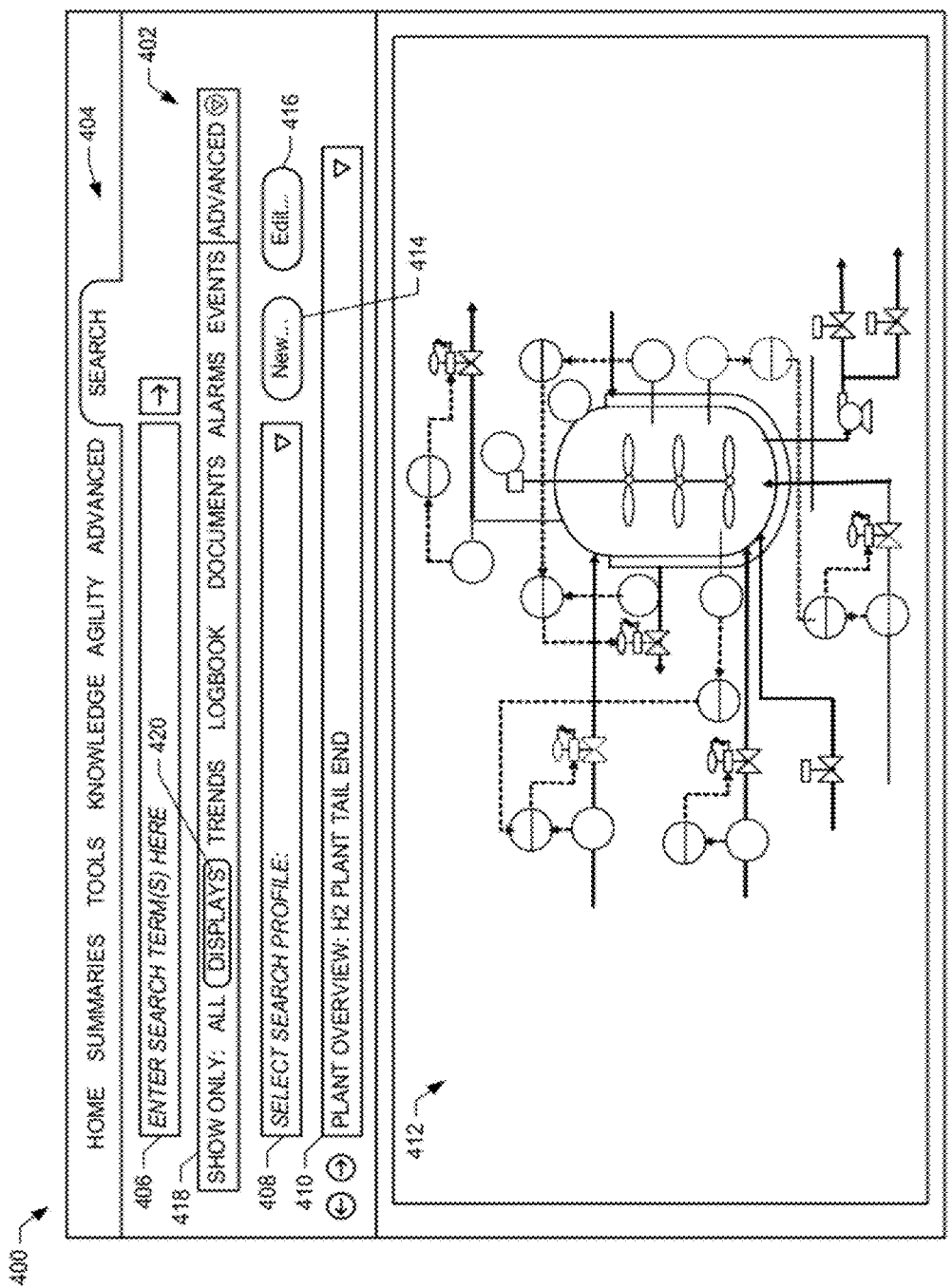
FIG. 4 is an example user interface including a search interface to provide a search service to a process control system.

FIG. 4 is an example user interface 400 including a search interface 402 to provide a search service to a process control system (e.g., the process control system 100 of FIG. 1). The example user interface 400 displays an application (e.g., the client application 120) that includes a navigation bar 404, a search text field 406, and a search profile selection bar 408. The example user interface 400 also displays a display selection bar 410 that may be used to select the display of a portion of the process control system 100 and a display area 412 that displays the portion of the process control system 100 selected using the display selection bar 410. The example client application 120 may be, for example, an enterprise application that enables a user to view process control information associated with the process control system 100 of FIG. 1. The navigation bar 404 shows several interactive views within the client application 120, which the user may select to interact with the client application 120 and/or the process control system 100 in different ways.

In the illustrated example, a search tab of the navigation bar 404 has been selected to display the search interface 402. As mentioned above, the example search interface 402 includes the search text field 406 to allow a user to enter a search query including one or more search parameters.

In some examples, a user may enter a type and/or category of a search parameter with text describing a name of the search parameter. For example, a user may enter a search category of 'block_type=PID' and a block name of 'block_name=FIC_101' into the search text field 406. Each of these search parameters is used by the search engine 204 to search the search database 304 for indexed process control information that includes a block type of PID and a block name of FIC_101. The search text field 406 may also support a user entering wildcard values (e.g., FIC*) and/or may auto fill text based on what a user has started to enter. The search query may be entered in plain language format, using Boolean connectors, using connectors, using search fields, and/or using any other types and/or features of search querying. Further, the search text field 406 may show a user recent text entered for previous searches.

The example search interface 402 of FIG. 4 further includes the search profile selection bar 408 to allow a user to select a search profile to associate with the search. A search profile may modify the search query and/or modify the results displayed from a search as specified by a user and/or adapted from previous search queries and/or result selections. In some examples where a user does not select a search profile, the search interface 402 may specify a default search profile. The example search interface 402 further includes a search profile creation button 414 and a search profile modification button 416. The search profile creation button 414 allows a user to create a new search profile for selection during later searches. The search profile modification button 416 allows a user to modify a selected existing search profile. An example user interface 700 for creating and/or modifying search profiles is described below in conjunction with to FIG. 7.

The example search interface 402 further includes a search category bar 418. The example search category bar 418 includes selectable search parameters that the search interface 230 may use in conjunction with a specified search query and/or search profile to locate matching process control information. In this example, a Displays search parameter 420 is selected. By selecting the Displays search parameter 420, the searcher 310 of FIG. 3 searches for process control information associated with a display type of graphical representation. In other examples, a selection of the Trends search parameter causes the searcher 310 to search for process control information associated with process trends and/or history including, for example, runtime data, graphs, and/or charts. A selection of the Documents search parameter causes the searcher 310 to search for source information documents that are associated with the specified search query and/or search profile.

Figure 5:
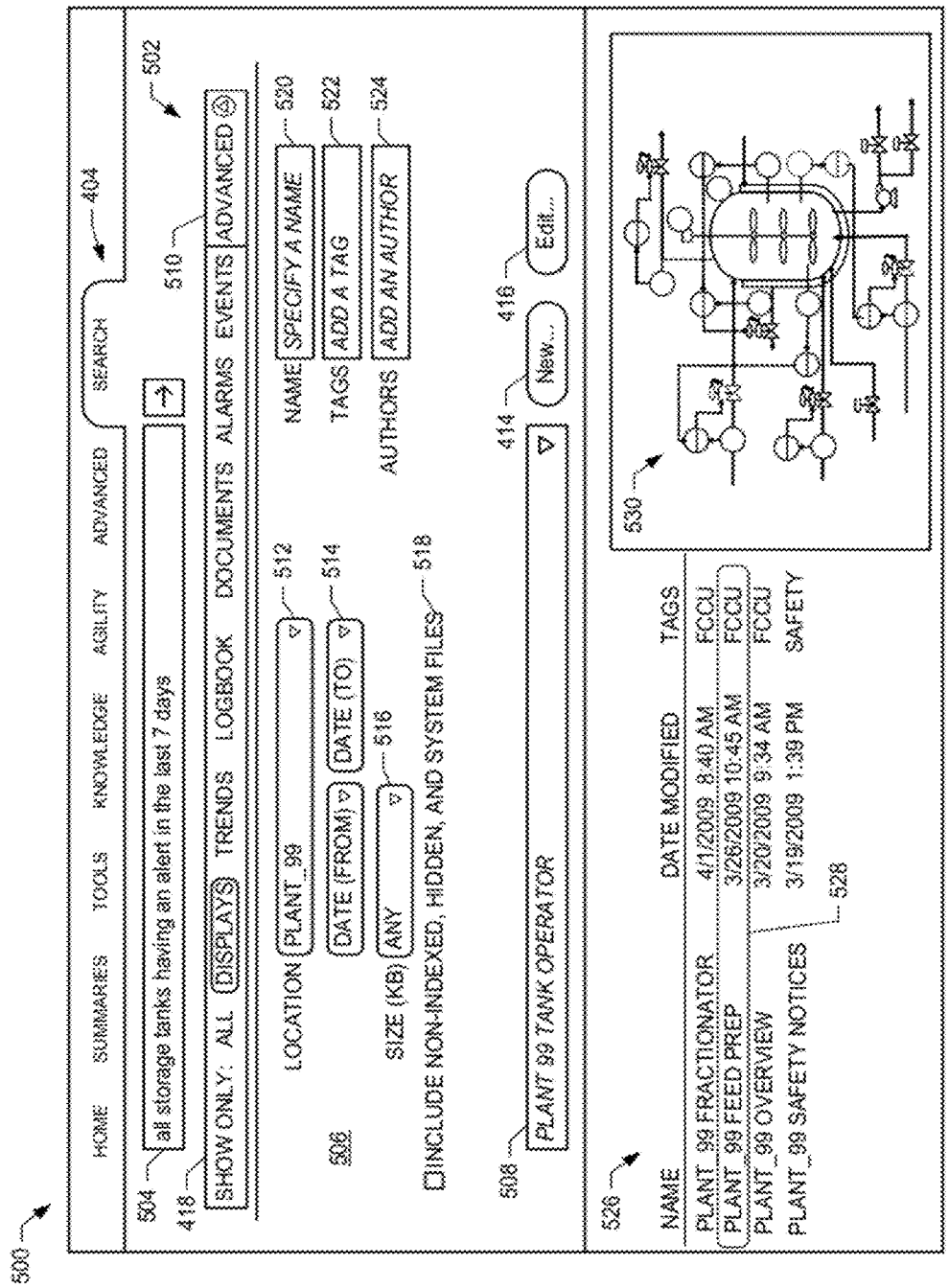
FIG. 5 is another example user interface including a search interface with a search query, an advanced search panel, and a selectable search profile.

FIG. 5 is another example user interface 500 including a search interface 502 with a search query 504, an advanced search panel 506 and a selected search profile 508. Additionally, FIG. 5 shows the example search category bar 418, where the user has selected an advanced search button 510 that causes the client application 120 of FIG. 1 to display the advanced search panel 506.

The example advanced search panel 506 enables a user to more accurately and/or more specifically provide search parameters. The advanced search panel 506 of the illustrated example includes a location field 512 that may be used to specify a location (e.g., PLANT_99) within the process control system 104 to conduct a search. The advanced search panel 506 includes a date field 514 that enables a user to search for process control information modified and/or created within the specified date range. The advanced search panel 506 also includes a file size field 516 to search for process control information below or above a specified file size. Additionally, the advanced search panel 506 includes an inclusion selector 518 that a user may select to instruct the search engine 302 to search other workstations and/or other process control components for process control information that is not indexed within the search database 304.

Further, the advanced search panel 506 includes a name field 520 that enables a user to enter a name of indexed process control information as a search parameter and a tags field 522 that enables a user to enter an identifier of indexed process control information as a search parameter. The advanced search field 506 also includes an authors field 524 that enables a user to specify an author of source information as a search parameter. In some examples, a user may add and/or remove fields from the advanced search panel 506. For example, a user may add a field for field device names if the user wants to specify a search parameter with a field device name. Further, the fields 512-516 show an arrow indicating a drop down box that contains selectable search parameters. The fields 512-516 include the drop down boxes because the fields 512-516 have a limited number of possible values. For example, there are only a certain number of possible dates to select within the date field 514. In another example, a field associated with controllers may include a drop down box with the names of controllers (e.g., the controller 116 of FIG. 1) included within the process control system 100. In some other examples, the user may enter desired field designators (e.g., location) via the search query 504, followed by a delimiter (e.g., a colon, a semicolon, a hyphen, an equal sign) and the desired field value (e.g., Plant_99).

By entering text and/or selecting information within the fields 504, 512-524, a user specifies search parameters that the search engine 302 uses to search the search database 304 for matching indexed process control information. The client 104 may use display context information associated with the fields 504, 512-524 and/or selected categories within the search category bar 418 to determine a template for a graphical representation of the search results. Further, the search engine 302 may determine that the search parameters from the fields 504, 512-524 are transmitted from the client application 120 and generate the corresponding graphical representation of the search results shown within a search results panel 526.

The example in FIG. 5 also shows that a user selected the PLANT_99 Feed Prep search result as indicated by a selection indicator 528. The client application 120 determines that the process control information associated with the PLANT_99 Feed Prep search result has a data type corresponding to a schematic. In response to selecting the PLANT_99 Feed Prep search result, the client application 120 generates a graphical representation 530 of process control information linked to the PLANT_99 Feed Prep search result. The search interface then displays the graphical representation 530 as the schematic within the preview panel 526. In this example, the graphical representation 530 shows a schematic representation of devices and interconnections in the location PLANT_99.

Figure 6:
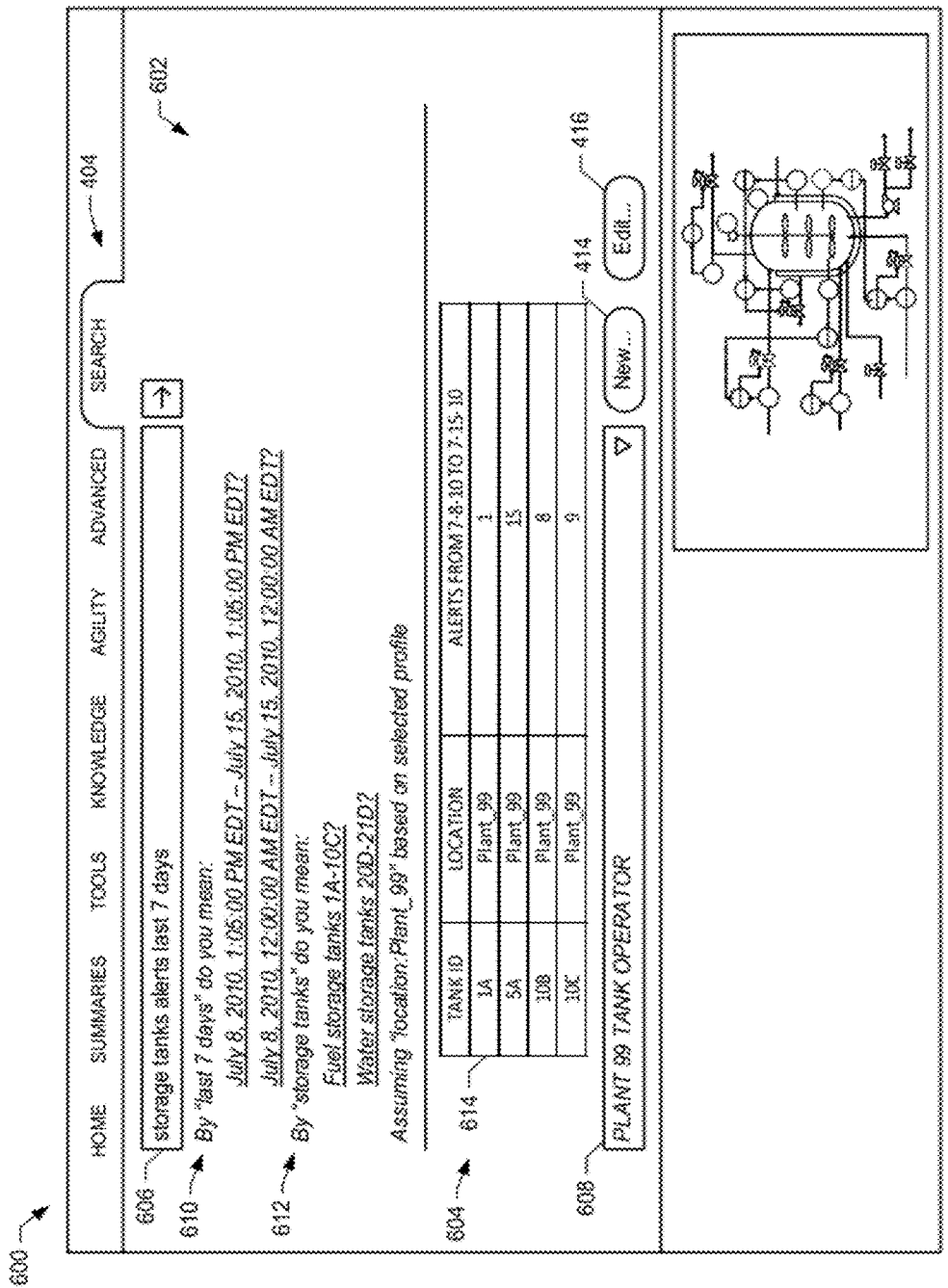
FIG. 6 is still another example user interface including a search interface with search results from an example search query and an example search profile.

FIG. 6 is an example user interface 600 including the navigation bar 404, a search interface 602 with search results 604 based on an example search query 606 and an example search profile 608. The example search interface 602 also includes the example search profile creation and search profile modification buttons 414 and 416.

The example search interface 602 also includes search hints or search clarifications 610 and 612, which are prompts displayed on the user interface 600 to prompt a user of the system to refine the search. For example, while parsing the search query 606, the searcher 310 may cause the search interface 602 to prompt the user with the search clarification 610 to specify what the user meant by "last 7 days." If the example query is run on Jul. 15, 2010 at 1:05:00 PM Eastern daylight time (EDT), the searcher 310 determines that the search term "last 7 days" may refer to the time from Jul. 8, 2010 at 1:05:00 PM EDT to Jul. 15, 2010 at 1:05:00 PM EDT or Jul. 8, 2010 at 12:00:00 AM EDT to Jul. 15, 2010 at 12:00:00 AM EDT. Similarly, the searcher 310 may cause the search interface 602 to prompt the user with the search clarification 612 to determine whether the search term "storage tanks" refers to fuel storage tanks 1A-10C or water storage tanks 20D-21D. Additionally, the searcher 310 added a "location:Plant_99" term to the search query 606 based on the selected search profile 608.

Prior to the selection of the search clarifications 610, 612, the searcher 310 also provides preliminary search results 614 based on the search query 606 and the search profile 608. The preliminary search results 614 may reflect, for example, that the term "storage tanks" is more likely to refer to fuel storage tanks and/or to the particular storage tanks shown in the example search results 614. The preliminary search results 614 are also restricted to tanks located in Plant_99 based on an addition of a search query term "location:Plant_99" in the selected search profile 608.

Figure 7:
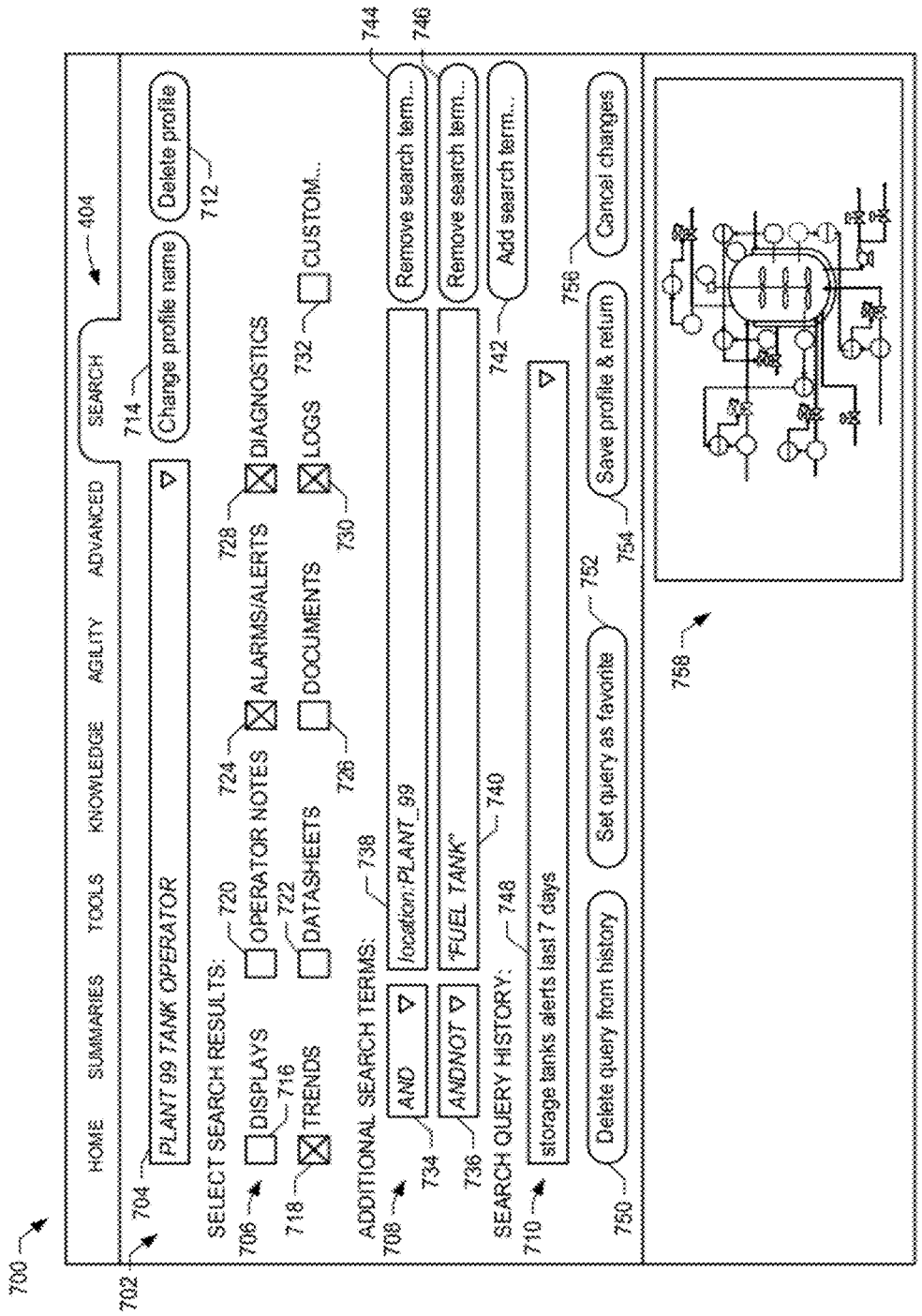
FIG. 7 is an example user interface including a search profile configuration interface.

FIG. 7 is an example user interface 700 including a search profile configuration interface 702. The search profile configuration interface 702 is selectable via the navigation bar 404 and may be accessed by a user of the process control system 100 of FIG. 1 to create, modify, or delete search profiles for use in later searching of the process control system 100. As described above, search profiles allow a user to specify preferred search results and/or modifications to a search query. Search profiles may additionally or alternatively be maintained by the indexer 311 of FIG. 3 to weight previous queries submitted by a user and/or to weight results based on results selected by a user based on previous queries. Weighting the previous queries may be based on, for example, a frequency of execution of the previous queries, frequency of search terms used in the previous queries, specificities and/or generalities of the previous queries (e.g., narrow and/or broad scope(s) of the search terms used in the previous queries), etc.

The example search profile configuration interface 702 includes a search profile selection bar 704, search results selections 706, additional search terms 708, and a search query history 710. The search profile selection bar 704 may be used to select a search profile for modification or deletion via a profile deletion button 712. Modification of the selected search profile may include changing the profile name via a profile name change button 714; selecting preferred search results; adding, modifying, and/or deleting search query terms to be included; and/or modifying the historical search queries.

A user may select preferred search results using the search results selections 706, which may include displays 716, trends 718, operator notes 720, datasheets 722, alarms and/or alerts 724, documents 726, diagnostics 728, logs 730, and/or custom search results 732. While the search results selections 706 of FIG. 7 include the illustrated selections 716-732, the search results selections 706 may additionally or alternatively include other selections such as device location(s), current data readings, historical data readings for specified time periods, manufacturer-specific information, installation-specific information (e.g., what a device is measuring, configuration data, etc.), and/or any other types of process control information that may be stored in the search databases.

The user may also modify the selected search profile by specifying search terms to be added to search queries performed using the search profile. The example additional search terms 708 may be specified using Boolean operators 734 and 736 and query terms 738 and 740. The Boolean operators 734 and 736 may include any Boolean operators such as AND, ANDNOT (i.e., NAND, NOT), OR, NOTOR (i.e., NOR), X-OR (i.e., XOR), and/or any other Boolean operators. The Boolean operators 734 and 736 modify the query associated with a search when the search profile is selected to append the respective query terms 738 and 740 to the query. While two example query terms 738 and 740 are included in the example search profile, additional query terms may be added to the selected search profile by selecting an query term addition button 742 and the query terms 738 and 740 may be removed from the selected search profile by selecting the respective query term removal buttons 744 and 746.

The user may further modify the example search profile of FIG. 7 by modifying the search query history 710. The example search query history 710 includes a historical query selection bar 748 to allow the user to select any of the historical search queries previously run using the selected search profile. The example historical query selection bar 748 may display the queries as originally entered and/or as modified by the search query when run. As described above, the search profile may modify and/or change the relative weights of query terms and/or search results after a user enters a query, so the historical query selection bar 748 may advantageously display historical queries as modified to inform the user of the actual query leading to the historical search results. After selecting a historical search query, the user may delete the query from the search query history 710 by selecting a historical query deletion button 750 and/or elevate the weight and/or status of a query by selecting a favorite query button 752.

After modifying the selected search profile, the user may select a search profile save button 754 to save any changes to the search profile. If the user does not want to accept the changes, the user may cancel the changes to the search profile by selecting a cancel changes button 756. The search profile save button 754 and/or the cancel changes button 756 may additionally close the search profile configuration interface 702 and return the user to a previous search interface, such as the example search interfaces 402, 502, 602 of FIGS. 4-6.

The example search profile configuration interface 702 may further include a preview display 758. The preview display 758 may show, for example, the previous interface that the user was interacting with prior to opening the search profile configuration interface 702, a preview of results for a selected historical query in the search query history 710, and/or any other supplemental and/or contextual information that may be displayed to a user while configuring the search profiles.

Figure 8:
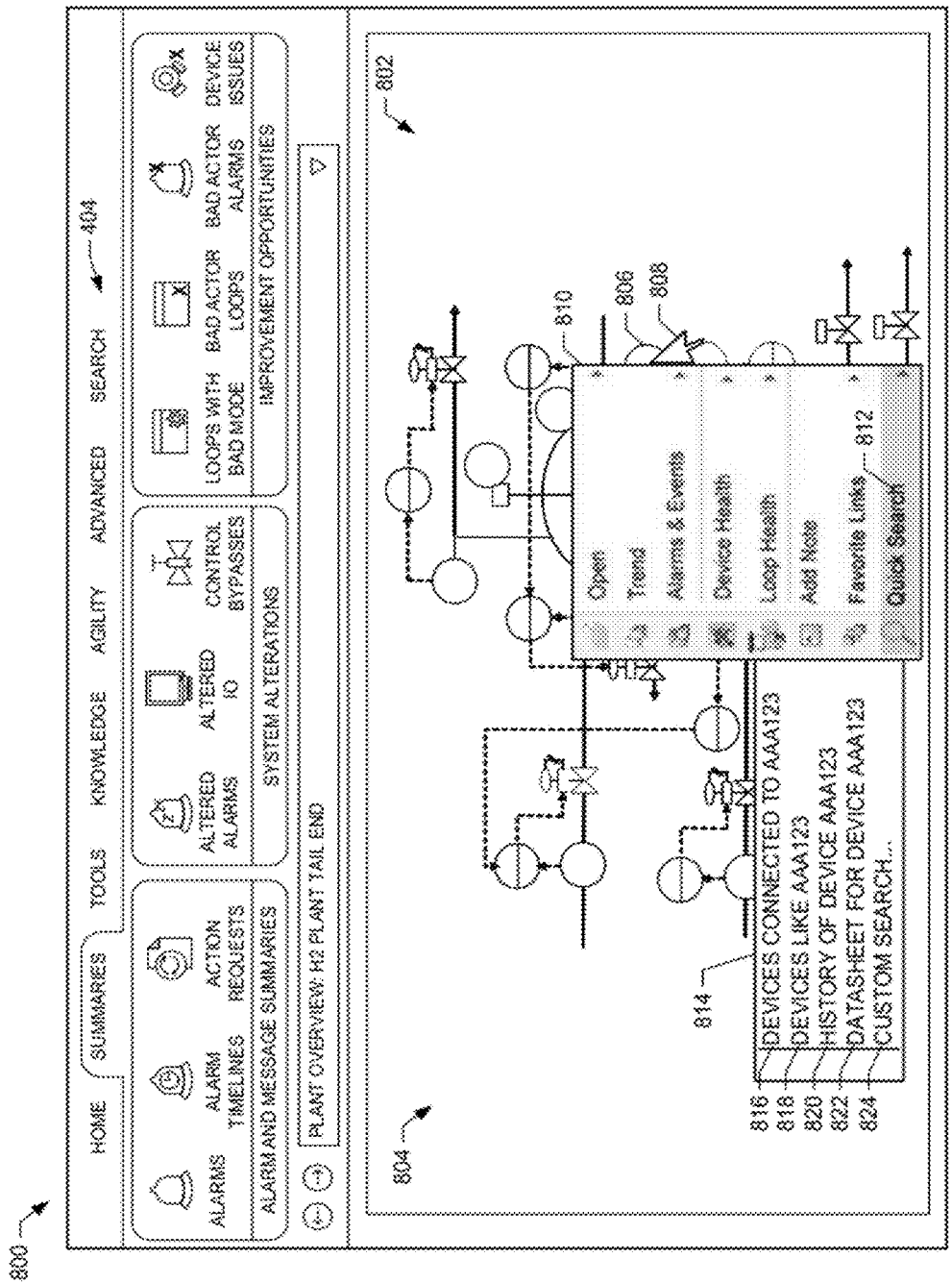
FIG. 8 is another example user interface including an integrated search interface.

FIG. 8 is another example user interface 800 including an integrated search interface 802. The integrated search interface 802 of FIG. 8 may include any other user interface display, such as a display of a process control system schematic 804 as illustrated in FIG. 8 or any other user interface display available via the navigation bar 404. Thus, the integrated search interface 802 allows a user of the process control system 100 to search quickly for relevant process control information in context without having to navigate to the search interface via the navigation bar 404 and manually enter a search query.

As illustrated in FIG. 8, the user selects a device representation (e.g., a schematic representation of a device 806) in the process control system schematic 804 via a cursor 808. In some examples, the user selects the device representation using a secondary mouse click (e.g., a right-click for right-handed users in a Windows® operating system environment) to cause a contextual menu 810 to be displayed on the user interface 800. The example contextual menu 810 includes options for selection by the user that are relevant to the selected device 806 in the context (e.g., the process control system schematic 804). For example, the contextual menu 810 for the selected device 806 may include options for opening a trend of readings from the selected device 806, viewing alarms and/or events associated with the selected device 806, accessing device health information, adding an operator note, quickly accessing other interfaces (e.g., favorites) from the user interface 800, and/or performing a quick search 812.

The example quick search 812 contextual option opens up an additional menu 814 of quick searches 816, 818, 820, 822, and a custom search 824. The example quick searches 816-822 allow a user to quickly access relevant information about the selected device 806 such as locating devices connected to the selected device 806 (816), devices similar to the selected device 806 (818), historical information about the selected device 806 (820), and/or the datasheet for the selected device 806 (822). The custom search 824 may, for example, cause the user interface 800 to display a search interface such as the example search interfaces 402, 502, 602 of FIGS. 4-6. Other quick searches 816-822 may additionally or alternatively be included in the example menu 814 as options when a user selects the quick search 812 contextual option.

While an example manner of implementing the search engine 204 and the search interface 230 of FIG. 2 has been illustrated in FIG. 3, one or more of the elements, processes and/or devices illustrated in FIG. 3 may be combined, divided, re-arranged, omitted, eliminated and/or implemented in any other way. Further, the example search framework 302, the example search database 304, the example queries and knowledge database 306, the example search profile database 308, the example searcher 310, the example indexer 311, the example subscriber 312, the example publishers 314-318, the example data change listener(s) 320, the example application interface 322, the example processor 324, the example renderer 326, the example saved search manager 328, the example search results database 330, the example search filter 332, the example display data manager 334, the example client interface 336, and/or, more generally, the example search engine 204 and/or the example search interface 230 of FIG. 3 may be implemented by hardware, software, firmware and/or any combination of hardware, software and/or firmware. Thus, for example, any of the example search framework 302, the example search database 304, the example queries and knowledge database 306, the example search profile database 308, the example searcher 310, the example indexer 311, the example subscriber 312, the example publishers 314-318, the example data change listener(s) 320, the example application interface 322, the example processor 324, the example renderer 326, the example saved search manager 328, the example search results database 330, the example search filter 332, the example display data manager 334, the example client interface 336, and/or, more generally, the example search engine 204 and/or the example search interface 230 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example search framework 302, the example search database 304, the example queries and knowledge database 306, the example search profile database 308, the example searcher 310, the example indexer 311, the example subscriber 312, the example publishers 314-318, the example data change listener(s) 320, the example application interface 322, the example processor 324, the example renderer 326, the example saved search manager 328, the example search results database 330, the example search filter 332, the example display data manager 334, and/or the example client interface 336 are hereby expressly defined to include a computer readable medium such as a memory, DVD, CD, etc. storing the software and/or firmware. Further still, the example search engine 204 and/or the example search interface 230 of FIG. 3 may include one or more elements, processes and/or devices in addition to, or instead of, those illustrated in FIG. 3, and/or may include more than one of any or all of the illustrated elements, processes and devices.

Figure 9:
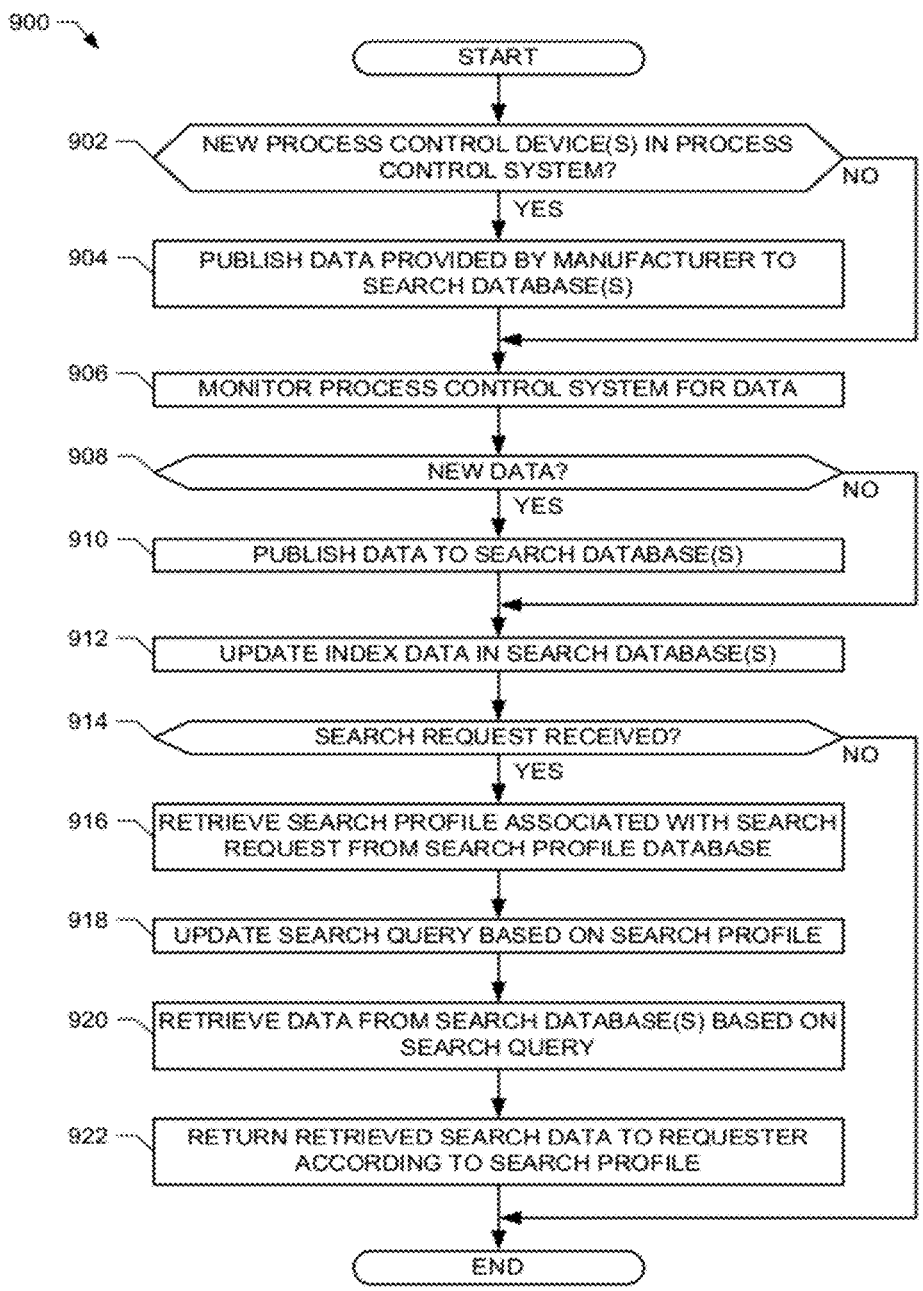
FIG. 9 is a flowchart of an example method that may be performed to implement the example search engine and the example search interface of FIG. 3.

A flowchart representative of an example process 900 for implementing the search engine 204 of FIG. 3 is shown in FIG. 9. The example process 900 may comprise machine readable instructions in the form of a program for execution by a processor such as the processor 1002 shown in the example computer 1000 discussed below in connection with FIG. 10. The program may be embodied in software stored on a computer readable medium such as a CD-ROM, a floppy disk, a hard drive, a digital versatile disk (DVD), or a memory associated with the processor 1002, but the entire program and/or parts thereof could alternatively be executed by a device other than the processor 1002 and/or embodied in firmware or dedicated hardware. Further, although the example program is described with reference to the flowchart illustrated in FIG. 9, many other methods of implementing the example search engine 204 may alternatively be used. For example, the order of execution of the blocks may be changed, and/or some of the blocks described may be changed, eliminated, or combined.

As mentioned above, the example operations of FIG. 9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example operations of FIG. 9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The example process 900 of FIG. 9 may be performed to implement the example search engine 204 of FIG. 3. The example process 900 may be implemented using machine readable instructions executed on the example FDI server 106 of FIG. 1, the example client 104, and/or the example computer 1000 of FIG. 10.

The example process 900 begins by determining (e.g., via the subscriber 312 of FIG. 3) whether new process control device(s) (e.g., the devices 128-136 of FIG. 1) are present in a process control system (e.g., the process control system 100) (block 902). As used herein, "new" process control devices refers to process control devices newly present in the process control system 100 as compared to a previous time (e.g., devices connected to the system, devices reconnected to the system from an offline state, devices connected to the system for the first time, etc.). If there are new process control devices present (block 902), publisher(s) (e.g., the device publisher 314 of FIG. 3) publishes data provided by the manufacturer(s) of the new devices to the search database 304 of FIG. 3 (block 904).

If there are no new devices (block 902), or when the device publisher 314 has published data for the new devices to the search database 314 (block 904), the example subscriber 312 monitors the process control system 100 for new data (block 906). Monitoring for data may include, for example, listening for messages on the device networks 210 of FIG. 2, listening to the publishers 314-318 of FIG. 3 for data, etc. The indexer 311 may then determine whether new data is available (block 908). As used herein, "new" data refers to process control data received by the subscriber 312 that corresponds to process control devices, applications, controllers, and/or any other process control data that has not been previously recognized by the subscriber 312. Data received by the subscriber 312 is provided to the indexer 311 for indexing. If new data is available (block 908), the example indexer 311 publishes the data to the search database 314 and/or to any other appropriate databases (block 910).

If there is no new process control data (block 908), or when the indexer 311 publishes the new process control data to the search database 314 (block 910), the example indexer 311 updates index data in the search database 314 (block 912). For example, the indexer 311 may update the index data based on published data for new process control devices and/or based on newly-published process control data.

At block 914, the example searcher 310 determines whether a search request has been received (e.g., from the search interface 230 of FIG. 3, from the processor 324, from the client application 120 of FIG. 1). The search request may include a search query, keywords, a specified search profile, an application context, and/or any other information relevant to a search of the process control system 100. If a search request has been received (block 914), the searcher 310 retrieves the search profile associated with the search request from the search profile database 318 (block 916). Based on the specified search profile, the searcher 310 updates the search query (block 918). For example, the searcher 310 may change the received search query to specify particular types of search results and/or add terms to the search query.

The searcher 310 then retrieves data from the search database 314 based on the updated search query (block 920). For example, the searcher 310 may execute a search using the Wolfram Alpha search engine to obtain search results from the search database 314 corresponding to the search query as modified by the search profile. The searcher 310 returns the retrieved search data to the requester (e.g., to the search interface 230 of FIG. 3, to the processor 324, to the client application 120 of FIG. 1) according to the search profile for display to a user of the process control system 100 (block 922). For example, the searcher 310 may retrieve search results based on the search query and return only those types of search results that are selected in the search profile. After the searcher 310 returns the results (block 922) or, if the searcher 310 does not receive a search request (block 914), the example process 900 may end. Alternatively, the example process 900 may iterate to block 902 to continue monitoring for new devices, monitoring for process control data, and/or serving search requests.

Figure 10:
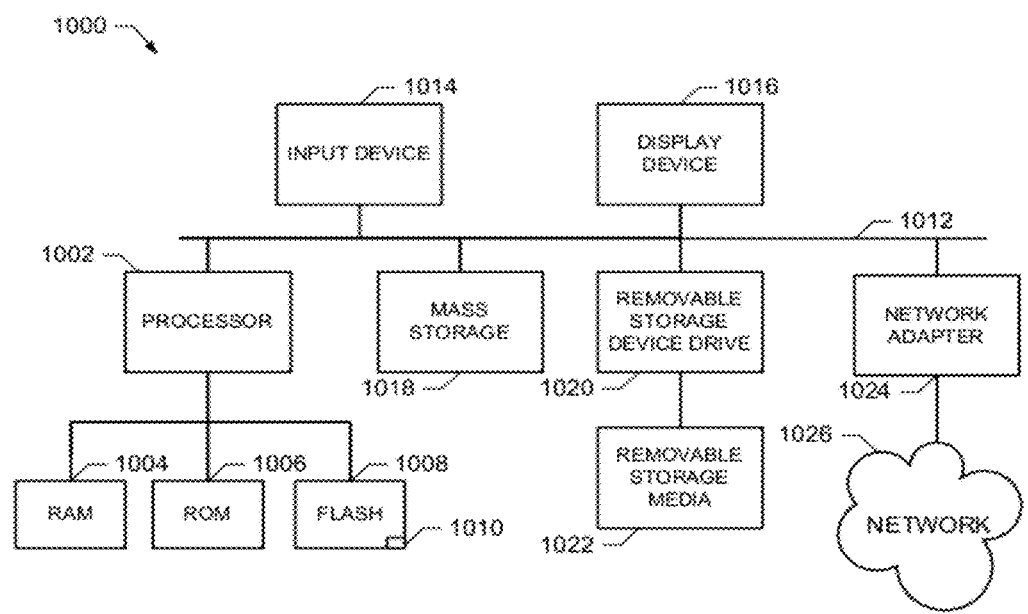
FIG. 10 is a block diagram of an example computer capable of executing the method of FIG. 9 to implement the example client of FIG. 1, the example search engine and/or the example search interface of FIG. 3.

FIG. 10 is a block diagram of an example computer 1000 capable of executing the process 900 of FIG. 9 to implement the search engine 204 of FIG. 3, the search interface 230. The example computer 1000 may additionally or alternatively be used to implement the client 104 of FIG. 1 to execute the client application 120. The computer 1000 can be, for example, a server, a personal computer, a mobile phone (e.g., a cell phone), a personal digital assistant (PDA), an Internet appliance, or any other type of computing device.

The example processor system 1000 includes a processor 1002 having associated memories, such as a random access memory (RAM) 1004, a read only memory (ROM) 1006 and a flash memory 1008. For example, the processor 1002 can be implemented by one or more Intel® microprocessors from the Pentium® family, the Itanium® family or the XScale® family. Of course, other processors from other families are also appropriate.

The RAM 1004, the ROM 1006, and/or the flash memory 1008 may store machine-readable instructions that implement the process 900 of FIG. 9. The RAM 1004 may be implemented by Synchronous Dynamic Random Access Memory (SDRAM), Dynamic Random Access Memory (DRAM), RAMBUS Dynamic Random Access Memory (RDRAM) and/or any other type of random access memory device. The flash memory 1008 of the illustrated example includes a boot block 1010. Access to the RAM 1004, the ROM 1006, and the flash memory 1008 is typically controlled by a memory controller (not shown).

The processor 1002 is coupled to an interface, such as a bus 1012 to which other components may be interfaced. In the illustrated example, the components interfaced to the bus 1012 include an input device 1014, a display device 1016, a mass storage device 1018 and a removable storage device drive 1020. The removable storage device drive 1020 may include associated removable storage media 1022 such as magnetic or optical media.

The input device(s) 1014 permit a user to enter data and commands into the processor 1002. The input device 1014 may be implemented using any one or more of a keyboard, a mouse, a touch screen, a track pad, a barcode scanner or any other device that enables a user to provide information to the processor 1002.

The display device 1016 may be, for example, a liquid crystal display (LCD) monitor, a cathode ray tube (CRT) monitor or any other suitable device that acts as an interface between the processor 1002 and a user. The display device 1016 as pictured in FIG. 10 includes any additional hardware required to interface a display screen to the processor 1002.

The mass storage device 1018 may be, for example, a conventional hard drive or any other magnetic or optical media that is readable by the processor 1002.

The removable storage device drive 1020 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 1022 is complimentary to the removable storage device drive 1020, inasmuch as the media 1022 is selected to operate with the drive 1020. For example, if the removable storage device drive 1020 is an optical drive, the removable storage media 1022 may be a CD-R disk, a CD-RW disk, a DVD disk or any other suitable optical disk. On the other hand, if the removable storage device drive 1020 is a magnetic media device, the removable storage media 1022 may be, for example, a diskette or any other suitable magnetic storage media.

Coded instructions to implement the process 900 of FIG. 9 may be stored in the RAM 1004, in the ROM 1006, in the flash memory 1008, in the mass storage device 1018, and/or on the removable storage media 1022 such as a CD or DVD.

From the foregoing, it will appreciate that the above disclosed systems, methods, and articles of manufacture may be used to provide a search service to a process control system. The example systems, methods, and articles of manufacture described above provide users of a process control system to rapidly search for and locate desired devices, applications, and/or information associated with the process control system from different contexts. Additionally, the example systems, methods, and articles of manufacture provide users of the process control system with configurable search profiles to specify desired types of search results for faster searching and retrieval of results than without using search profiles.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A field device integration (FDI) server to provide a search service to users of a process control system, the FDI server comprising:
   a search database to store a set of searchable items associated with a plurality of field devices of the process control system and to store a user search profile associated with a selected query result;
   a publisher implemented via a processor, the publisher to collect information associated with the searchable items from the process control system and to publish the collected information to the search database; and
   a searcher implemented via a processor, the searcher to:
      receive a search request including the user search profile and a search query of the searchable items in the search database;
      request an update service from the publisher in response to receiving the search request, the publisher to collect updated information associated with the searchable items from the process control system in response to the request for the update service and to publish the updated collected information to the search database;
      modify the search query based on the user search profile;
      search the searchable items based on the modified search query;
      filter results of the search based on a filter condition included in the user search profile; and
      return at least a portion of the collected information and the updated collected information based on the user search profile and the filter condition.

2. The FDI server as defined in claim 1, wherein the searcher includes an indexer to index the searchable items based on the collected information and the updated collected information.

3. The FDI server as defined in claim 1, wherein the searcher is to modify the user search profile based on the search query.

4. The FDI server as defined in claim 1, wherein the user search profile includes a user preference for one or more types of search results.

5. The FDI server as defined in claim 1, wherein the collected information includes at least one of process control operating data, device measurements, alarms, alerts, or device location.

6. The FDI server as defined in claim 1, wherein the search database stores information associated with off-line and on-line process control devices.

7. The FDI server as defined in claim 1, wherein the search query includes an application context and the searcher is to search the searchable items based on the application context.

8. The FDI server as defined in claim 1, wherein the filter condition includes security access of a user associated with the user search profile.

9. The FDI server as defined in claim 1, wherein the publisher is to collect the information associated with the searchable items based on an FDI standard.

10. A method to provide a search service to users of a process control system, the method comprising:
    collecting information from the process control system at a field device integration (FDI) server, the collected information including searchable items associated with a plurality of field devices of the process control system;
    publishing the collected information to a search database maintained by the FDI server;
    requesting an update service via the FDI server in response to receiving a search request, the search request including a user search profile and a search query of the searchable items in the search database;
    collecting updated information from the process control system at the FDI server in response to the requested update service;
    publishing the updated collected information to the search database;
    modifying the search query via the FDI server based on the user search profile;
    searching the searchable items via the FDI server based on the modified search query;
    filtering results of the search via the FDI server based on a filter condition included in the user search profile; and
    returning at least a portion of the collected information and the updated collected information via the FDI server based on the user search profile and the filter condition.

11. The method as defined in claim 10, further comprising indexing the searchable items via the FDI server based on the collected information and the updated collected information.

12. The method as defined in claim 10, further comprising modifying the user search profile via the FDI server based on the search query.

13. The method as defined in claim 10, wherein the user search profile includes a user preference for one or more types of search results.

14. The method of claim 10, wherein the collected information includes at least one of process control operating data, device measurements, alarms, alerts, or device location.

15. The method of claim 10, wherein the filter condition includes security access of a user associated with the user search profile.

16. A non-transitory computer readable medium comprising machine readable instructions which, when executed by a processor, cause a field device integration (FDI) server to at least:
   collect information from a process control system, the collected information including searchable items associated with a plurality of field devices of the process control system;
   publish the collected information to a search database maintained by the FDI server;
   request an update service in response to receiving a search request, the search request including a user search profile and a search query of the searchable items in the search database;
   collect updated information from the process control system in response to the requested update service;
   publish the updated collected information to the search database;
   modify the search query based on the user search profile;
   search the searchable items based on the modified search query;
   filter results of the search based on a filter condition included in the user search profile; and
   return at least a portion of the collected information and the updated collected information based on the user search profile and the filter condition.

17. The non-transitory computer readable medium as defined in claim 16, wherein the instructions, when executed, further cause the FDI server to index the searchable items based on the collected information and the updated collected information.

18. The non-transitory computer readable medium as defined in claim 16, wherein the instructions, when executed, further cause the FDI server to modify the user search profile based on the search query.

19. The non-transitory computer readable medium as defined in claim 16, wherein the user search profile includes a user preference for one or more types of search results.

20. The non-transitory computer readable medium as defined in claim 16, wherein the filter condition includes security access of a user associated with the user search profile.

\* \* \* \* \*